United States Patent
Dobrinsky et al.

(10) Patent No.: US 10,509,162 B2
(45) Date of Patent: Dec. 17, 2019

(54) FLUID-BASED LIGHT GUIDING STRUCTURE AND FABRICATION THEREOF

(71) Applicant: Sensor Electronic Technology, Inc., Columbia, SC (US)

(72) Inventors: Alexander Dobrinsky, Silver Spring, MD (US); Michael Shur, Vienna, VA (US); Remigijus Gaska, Columbia, SC (US)

(73) Assignee: Sensor Electronic Technology, Inc., Columbia, SC (US)

( * ) Notice: Subject to any disclaimer, the term of this patent is extended or adjusted under 35 U.S.C. 154(b) by 0 days.

(21) Appl. No.: 16/035,749

(22) Filed: Jul. 16, 2018

(65) Prior Publication Data

US 2018/0329138 A1 Nov. 15, 2018

Related U.S. Application Data

(63) Continuation of application No. 15/387,592, filed on Dec. 21, 2016, now Pat. No. 10,025,028, which is a
(Continued)

(51) Int. Cl.
G02B 6/10 (2006.01)
F21V 8/00 (2006.01)
G02B 1/04 (2006.01)
G02B 6/34 (2006.01)
G02B 6/00 (2006.01)
(Continued)

(52) U.S. Cl.
CPC .............. *G02B 6/10* (2013.01); *G02B 1/045* (2013.01); *G02B 6/00* (2013.01); *G02B 6/0003* (2013.01); *G02B 6/0065* (2013.01); *G02B 6/102* (2013.01); *G02B 6/1221* (2013.01); *G02B 6/34* (2013.01); *G02B 2006/0325* (2013.01)

(58) Field of Classification Search
None
See application file for complete search history.

(56) References Cited

U.S. PATENT DOCUMENTS 4,045,119 A 8/1977 Eastgate
5,675,689 A 10/1997 Nath
(Continued)

FOREIGN PATENT DOCUMENTS

WO 2005011753 A1 2/2005

OTHER PUBLICATIONS

Agilent Technologies, "Light Guide Techniques Using LED Lamps, Application Brief I-003," 2001, 22 pages.
(Continued)

*Primary Examiner* — Tina M Wong
(74) *Attorney, Agent, or Firm* — LeBatt, LLC

(57) ABSTRACT

A solution for fabricating a structure including a light guiding structure is provided. The light guiding structure can be formed of a fluoropolymer-based material and include one or more regions, each of which is filled with a fluid transparent to radiation having a target wavelength, such as ultraviolet radiation. The region(s) can be created using a filler material, which is at least substantially enclosed by the fluoropolymer-based material and subsequently removed from each region. The structure can further include at least one optical element integrated into the light guiding structure.

20 Claims, 14 Drawing Sheets

Related U.S. Application Data continuation-in-part of application No. 14/853,057, filed on Sep. 14, 2015, now Pat. No. 9,696,484.

(60) Provisional application No. 62/050,126, filed on Sep. 13, 2014.

(51) Int. Cl.
*G02B 6/122* (2006.01)
*G02B 6/032* (2006.01)

(56) References Cited

U.S. PATENT DOCUMENTS

| | | | |
|---|---|---|---|
| 5,896,483 A | 4/1999 | Wojcik et al. | |
| 6,163,641 A | 12/2000 | Eastgate | |
| 6,314,226 B1 | 11/2001 | Nath | |
| 6,314,227 B1 | 11/2001 | Nath | |
| 6,418,257 B1* | 7/2002 | Nath | G02B 1/048 385/125 |
| 6,468,428 B1* | 10/2002 | Nishii | B01D 53/88 210/497.3 |
| 6,476,409 B2 | 11/2002 | Iwasaki et al. | |
| 6,501,893 B1* | 12/2002 | Iimura | G01N 21/7703 385/12 |
| 6,560,038 B1 | 5/2003 | Parkyn, Jr. et al. | |
| 6,771,866 B2* | 8/2004 | Iimura | G02B 6/02 385/12 |
| 6,773,584 B2 | 8/2004 | Saccomanno | |
| 6,863,428 B2 | 3/2005 | Lundin | |
| 6,936,854 B2 | 8/2005 | Iwasaki et al. | |
| 7,016,566 B2 | 3/2006 | Dimas et al. | |
| 7,211,763 B2 | 5/2007 | Zhang | |
| 7,613,378 B2 | 11/2009 | Girardon et al. | |
| 7,660,509 B2 | 2/2010 | Bryan et al. | |
| 7,914,852 B2 | 3/2011 | Belz et al. | |
| 7,960,706 B2 | 6/2011 | Ullman | |
| 8,177,383 B2 | 5/2012 | Reuben | |
| 8,434,909 B2 | 5/2013 | Nichol et al. | |
| 8,442,602 B2 | 5/2013 | Wong et al. | |
| 9,687,577 B2 | 6/2017 | Dobrinsky et al. | |
| 9,696,484 B2* | 7/2017 | Dobrinsky | G02B 6/1221 |
| 9,700,655 B2 | 7/2017 | Laudenslager et al. | |
| 9,703,055 B2 | 7/2017 | Dobrinsky et al. | |
| 9,855,352 B2 | 1/2018 | Dobrinsky et al. | |
| 2003/0044149 A1 | 3/2003 | Fraval et al. | |
| 2004/0036560 A1 | 2/2004 | Higuchi et al. | |
| 2006/0002675 A1 | 1/2006 | Choi et al. | |
| 2007/0279935 A1 | 12/2007 | Gardiner et al. | |
| 2009/0034236 A1 | 2/2009 | Reuben | |
| 2010/0014027 A1 | 1/2010 | Li et al. | |
| 2010/0165621 A1 | 7/2010 | Hoffend, Jr. et al. | |
| 2011/0149201 A1 | 6/2011 | Powell et al. | |
| 2011/0273906 A1 | 11/2011 | Nichol et al. | |
| 2011/0286222 A1 | 11/2011 | Coleman | |
| 2011/0309032 A1 | 12/2011 | Makl | |
| 2013/0106918 A1 | 5/2013 | Bita et al. | |
| 2013/0336839 A1 | 12/2013 | Gil et al. | |
| 2014/0001374 A1 | 1/2014 | Ullman | |
| 2014/0071142 A1 | 3/2014 | Steyn | |
| 2014/0204320 A1* | 7/2014 | Yang | G02F 1/133514 349/106 |
| 2014/0332674 A1* | 11/2014 | Goto | G01N 30/74 250/227.11 |
| 2014/0373606 A1 | 12/2014 | Kraiczek et al. | |
| 2015/0069265 A1 | 3/2015 | Smetona et al. | |
| 2015/0091043 A1 | 4/2015 | Shur et al. | |
| 2015/0360606 A1 | 12/2015 | Thompson et al. | |
| 2016/0074548 A1 | 3/2016 | Dobrinsky et al. | |
| 2017/0097466 A1* | 4/2017 | Dobrinsky | G02B 6/10 |
| 2018/0095264 A1* | 4/2018 | Borthakur | G02B 26/004 |

OTHER PUBLICATIONS

Colombe, Y., et al., "Single-mode optical fiber for high-power, low-loss UV transmission," Optics Express, Aug. 2014, p. 19783, vol. 22, No. 16.

Dupont, "Amorphous Fluoroplastic Resin," www.teflon.comtindustrial, 2013, 4 pages.

Fevrier, S., et al., "Ultraviolet guiding hollow-core photonic crystal fiber," 2009, 2888-2890, Opt. Lett.34(19).

Gebert, F., et al., "Damage-free single-mode transmission of deep-UV light in hollow-core PCF," Optics Express, Jun. 2014, p. 15388, vol. 22, No. 13.

Gonschior, C. P., et al. "Characterization of UV single-mode and low-mode fibers," 2010, Proc. of SPIE vol. 7559 75590X-1.

GORE® Diffuse Reflector Product, printed from http://www.gore.com/en_xx/products/electronic/specialty/specialty.html?RDCT=gore.com on Sep. 5, 2014.

Joo, B., et al., "Design guidance of backlight optic for improvement of the brightness in the conventional edge-lit LCD backlight," 2010, 6 pages.

Li, C., et al., "Prism-pattern design of an LCD light guide plate using a neural-network optical model," 2010, 5 pages.

Martin, et al., "Ordered arrays of polymeric nanopores by using inverse nanostructured PTFE surfaces," 2012, 10 pages, IOP Publishing.

Yamamoto, N., "Single-mode delivery of 250 nm light using a large mode area photonic crystal fiber," 2009, p. 16933-16940, Opt. Express17(19).

Yang, M., et al., "Optical properties of Teflon AF amorphous fluoropolymers," Jul.-Sep. 2008, 9 pages.

Deo, D., U.S. Appl. No. 14/853,057, Notice of Allowance, dated Mar. 1, 2017, 9 pages.

Deo, D., U.S. Appl. No. 14/853,057, Notice of Allowance, dated Dec. 28, 2016, 15 pages.

Deo, D., U.S. Appl. No. 14/853,057, dated Jul. 21, 2016, 21 pages.

Deo, D., U.S. Appl. No. 15/387,592, Notice of Allowance2, dated Mar. 5, 2018, 12 pages.

Deo, D., U.S. Appl. No. 15/387,592, Notice of Allowance, dated Jan. 22, 2018, 37 pages.

Bedtelyon, J., U.S. Appl. No. 15/854,332, Office Action1, dated May 11, 2018, 26 pages.

Bedtelyon, J., U.S. Appl. No. 15/633,103, Notice of Allowance, dated Nov. 30, 2017, 5 pages.

Bedtelyon, J., U.S. Appl. No. 15/633,103, Ex Parte Quayle Action, Oct. 6, 2017, 15 pages.

Bedtelyon, J., U.S. Appl. No. 14/853,014, Notice of Allowance, dated Feb. 28, 2017, 5 pages.

Bedtelyon, J., U.S. Appl. No. 14/853,104, Notice of Allowance, dated Nov. 21, 2016, 13 pages.

Bedtelyon, J., U.S. Appl. No. 14/853,014, Office Action 1, dated Jul. 1, 2016, 19 pages.

Ippolito, U.S. Appl. No. 14/853,036, Notice of Allowance, dated Mar. 1, 2017, 13 pages.

Ippolito, U.S. Appl. No. 14/853,036, Notice of Allowance, dated Jan. 23, 2017, 18 pages.

Ippolito, U.S. Appl. No. 14/853,036, Office Action1, dated Sep. 14, 2016, 15 pages.

Truong, B., U.S. Appl. No. 14/853,075, Notice of Allowance, dated Aug. 22, 2017, 32 pages.

Kang, S. International Application No. US2015/049917, International Search Report and Written Opinion, dated Dec. 23, 2015, 13 pages.

International Application No. US2015/049922, International Search Report and Mitten Opinion, dated Mar. 18, 2016, 14 pages.

Ippolito, N., U.S. Appl. No. 15/633,118, Office Action 1, dated Sep. 25, 2018, 11 pages.

Bedtelyon,J., U.S. Appl. No. 15/854,332, Notice of Allowance, dated Sep. 26, 2018, 8 pages.

Ippolito, N., U.S. Appl. No. 15/633,118, Notice of Allowance, dated Jan. 24, 2019, 8 pages.

Truong, B., U.S. Appl. No. 15/856,649, Office Action 1, dated Oct. 9, 2019, 10 pages.

\* cited by examiner

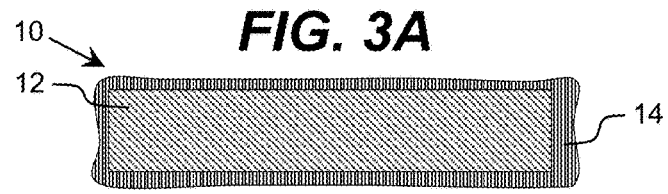
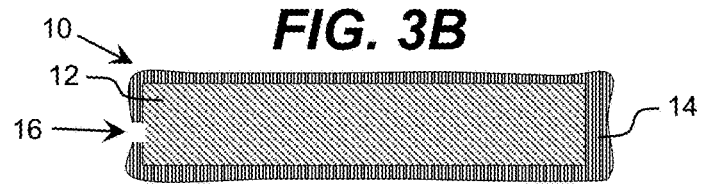
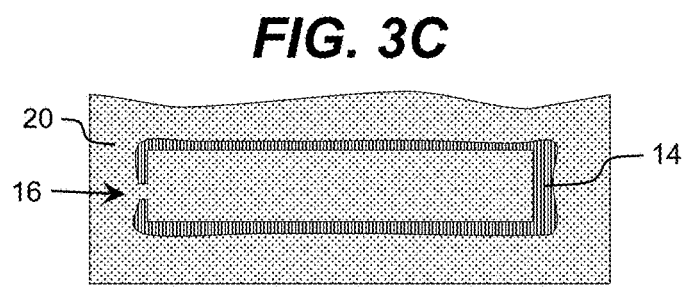
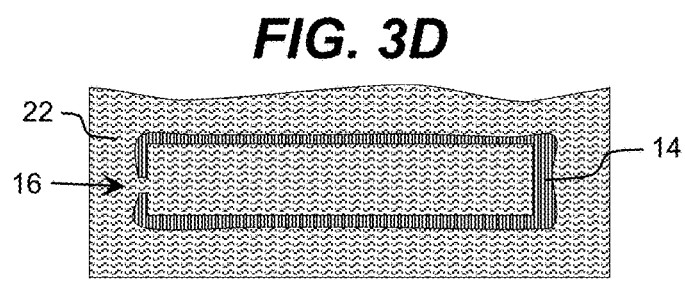
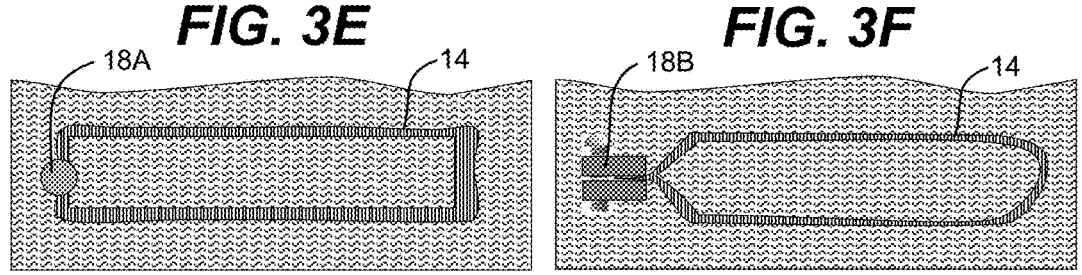

46A

46B

46C

46D

FLUID-BASED LIGHT GUIDING STRUCTURE AND FABRICATION THEREOF

REFERENCE TO RELATED APPLICATIONS

The current patent application is a continuation of U.S. application Ser. No. 15/387,592, filed on 21 Dec. 2016, which is a continuation-in-part of U.S. application Ser. No. 14/853,057, filed on 14 Sep. 2015, now U.S. Pat. No. 9,696,484, and which claims the benefit of U.S. Provisional Application No. 62/050,126, filed on 13 Sep. 2014, each of which is hereby incorporated by reference in its entirety to provide continuity of disclosure.

TECHNICAL FIELD

The disclosure relates generally to light guiding structures, and more particularly, to fabrication of a light guiding structure including a fluid.

BACKGROUND ART

Liquid core waveguide or light guiding structures can be beneficial for guiding ultraviolet (UV) radiation, e.g., due to the low UV absorbance properties of some liquids, such as purified water. The general availability of water allows for the fabrication of relatively inexpensive light guides for UV radiation that can be readily adopted for use in industry. Combined with a light guide enclosure formed of a fluoropolymer having low UV absorbance and other beneficial properties (e.g., chemical inertness, low biological contamination), the benefits of thin light guiding UV layers can be easily appreciated.

These light guiding structures, or so-called liquid core waveguides or flow cells, have been developed for optical spectroscopy applications in the ultraviolet, visible, and infrared regions of the light spectra. Such flow cells are particularly suitable when combined with optical fibers for light transfer, enabling the design of a flexible sensor system. A number of flow cells having a long optical path length have been designed for absorbance, fluorescence, and Raman spectroscopy. Similar to optical fibers, light is confined in such flow cells within the (liquid) core by total internal reflection (TIR) at the liquid core/wall interface or the liquid core/cladding (coating) interface. The only requirement is that the liquid core refractive index be higher than that of the refractive index of the ambient. For liquid core comprising purified water, and for ambient being air, this requirement is easily satisfied.

One approach to employ liquid-based light guiding structures describes a reactor configuration for UV treatment of water utilizing TIR and a flow tube. The inlet and core of the cylindrical tank reactor unit is a transparent flow tube that is surrounded by a sealed, concentric volume of material having a lower refractive index than the fluid flowing in the flow tube, which enables TIR of UV light when it is directed axially into the flow tube. Another approach discloses a method and reactor for in-line treatment of fluids and gases by light radiation comprising a tube or a vessel made of transparent material, preferably quartz glass, and surrounded by air, and having a fluid inlet, a fluid outlet, and at least one opening or window adapted for the transmission of light from an external light source into the tube. Air outside the tube or vessel has a lower refractive index compared to the treated fluid, which enables TIR. Still other approaches discuss various aspects of a liquid core light guide. One such approach discusses a liquid core waveguide photon energy material processing system.

Other approaches discuss the fabrication of a liquid light guiding layer. FIGS. 1A and 1B show one approach for fabricating a fluoropolymer-based enclosure according to the prior art. In this approach, as shown in FIG. 1A, fluoropolymer pellets 2 are placed into a container 4. Subsequently, heat is applied, which results in the fluoropolymer pellets 2 melting into a continuous fluoropolymer-based enclosure 6 as shown in FIG. 1B. Such an approach is limited with respect to how thin and to what precision the dimensions of the enclosure 6 can be manufactured. Furthermore, selection of the fluoropolymer material forming the pellets 2 and the material of the container 4 needs to result in no significant adhesion between the fluoropolymer-based enclosure 6 and the container 4 to facilitate removal of the fluoropolymer-based enclosure 6 from the container 4.

FIGS. 2A and 2B show a side and top view, respectively, of a fluoropolymer-based enclosure 8 according to the prior art. In this case, a fluoropolymer-based film is folded over and subsequently fused along the edges 9A-9C. Such an approach requires a flexible fluoropolymer-based film and results in a flexible fluoropolymer-based enclosure 8, which may not be advantageous in some applications. Additionally, similar to other approaches, the exact dimensions, particularly the thickness, of the enclosure 8 are difficult to precisely control.

SUMMARY OF THE INVENTION

This Summary Of The Invention introduces a selection of certain concepts in a brief form that are further described below in the Detailed Description Of The Invention. It is not intended to exclusively identify key features or essential features of the claimed subject matter set forth in the Claims, nor is it intended as an aid in determining the scope of the claimed subject matter.

The inventors recognize a need for a solution providing a method of manufacturing a thin light guiding layer and/or a light guiding layer with additional optical and diffusive scattering components.

Aspects of the invention provide a solution for fabricating a structure including a light guiding structure. The light guiding structure can be formed of a fluoropolymer-based material and include one or more regions, each of which is filled with a fluid transparent to radiation having a target wavelength, such as ultraviolet radiation. The region(s) can be created using a filler material, which is at least substantially enclosed by the fluoropolymer-based material and subsequently removed from each region. The light guiding structure can further include at least one optical element integrated into the light guiding structure. In addition, the light guiding structure can include structural support members that enable the light guiding structure to support objects of targeted weights so that these objects can be irradiated with one or more light sources that can be deployed with the light guiding structure. In one embodiment, the structural support members can include the use of pillars that can extend between various layers in the light guiding structure and crisscrossing support members placed between pairs of adjacent pillars in a layer. The light guiding structure can also include a set of diffusive elements configured to propagate light from the light source(s) in a diffusive manner.

A first aspect of the invention provides a method of fabricating a light guiding structure, the method comprising: forming an intermediate structure including a first filler material at least substantially enclosed by a fluoropolymer-based material; removing the first filler material from the intermediate structure to create a first region; filling the first region with a first fluid transparent to radiation having a target wavelength; and sealing the first region from ambient after the filling.

A second aspect of the invention provides a method of fabricating a structure, the method comprising: fabricating a light guiding structure formed of a fluoropolymer-based material, wherein the light guiding structure includes a first region filled with a first fluid transparent to radiation having a target wavelength, wherein the first region is created using a filler material subsequently removed from the first region; and integrating at least one optical element into the light guiding structure.

A third aspect of the invention provides a method of fabricating a light guiding structure, the method comprising: forming an intermediate structure formed of a fluoropolymer-based material, wherein the intermediate structure includes a plurality of regions, each region defined by filler material at least substantially enclosed by the fluoropolymer-based material; removing the filler material from each of the plurality of regions; sealing a subset of the plurality of regions from ambient, wherein the plurality of regions includes at least one unsealed region; filling each unsealed region of the plurality of regions with a liquid transparent to radiation having a target wavelength; and sealing each unsealed region of the plurality of regions from ambient after the filling.

A fourth aspect of the invention provides a light guiding structure, comprising: a plurality of ultraviolet transparent fluid layers; a plurality of fluoropolymer layers, each fluoropolymer layer disposed between a pair of ultraviolet transparent fluid layers; and a encapsulant that encapsulates the plurality of ultraviolet transparent fluid layers and the plurality of fluoropolymer layers.

A fifth aspect of the invention provides a system, comprising: at least one light source; and a multi-layered light guiding structure coupled to the at least one light source, including: a plurality of ultraviolet transparent fluid layers; and a plurality of fluoropolymer layers, each fluoropolymer layer disposed between a pair of ultraviolet transparent fluid layers.

A sixth aspect of the invention provides a system, comprising: a plurality of light sources; and a multi-layered light guiding structure coupled to the plurality of light sources, including: a plurality of ultraviolet transparent fluid layers, each including one of: a gas, water or air; and a plurality of fluoropolymer layers, each fluoropolymer layer disposed between a pair of ultraviolet transparent fluid layers; and a substrate that supports the plurality of light sources and the multi-layered light guiding structure, wherein the plurality of light sources are disposed across the substrate, each light source configured to direct light to at least one object placed on the multi-layered light guiding structure.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 3A-3F show an illustrative process for forming a light guiding layer according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1A:
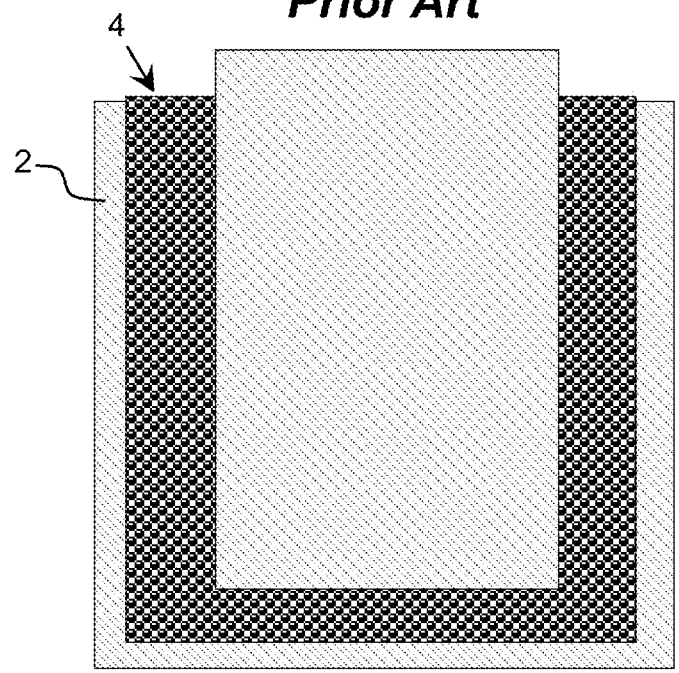
FIGS. 1A and 1B show one approach for fabricating a fluoropolymer-based enclosure according to the prior art.
Figure 1B:
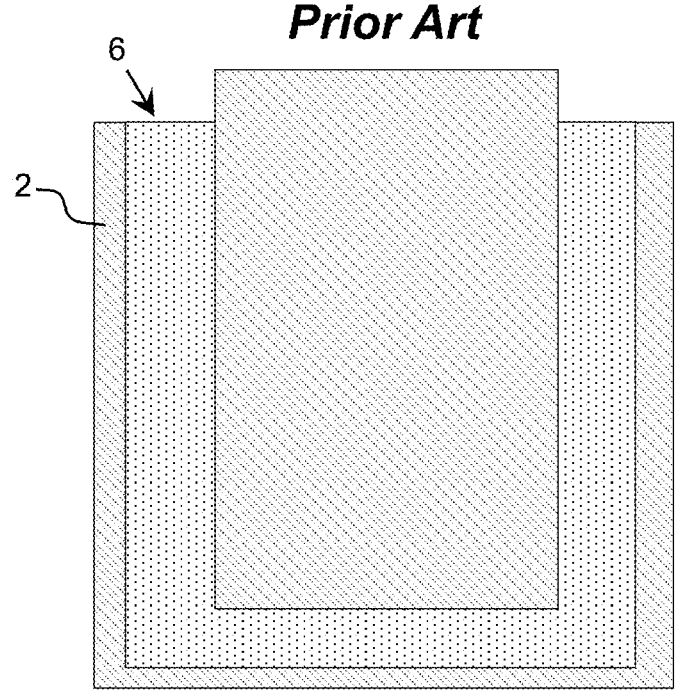
Figure 2A:
FIGS. 2A and 2B show a side and top view, respectively, of a fluoropolymer-based enclosure according to the prior art.
Figure 2B:
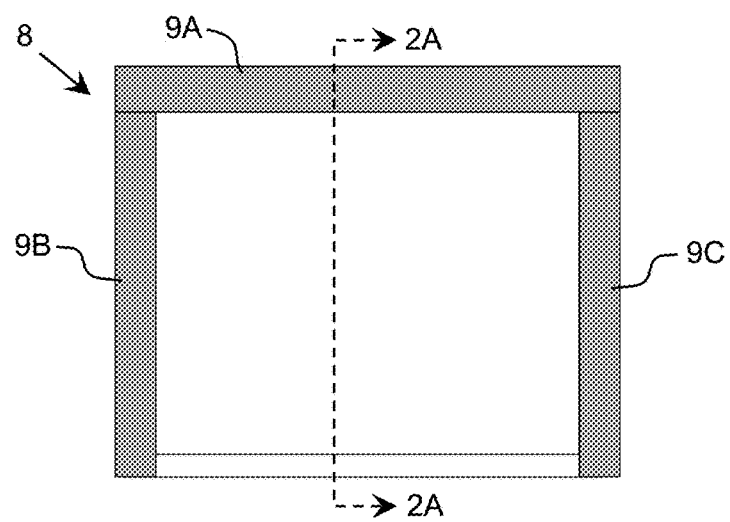

As indicated above, aspects of the invention provide a solution for fabricating a structure including a light guiding structure. The light guiding structure can be formed of a fluoropolymer-based material and include one or more regions, each of which is filled with a fluid transparent to radiation having a target wavelength, such as ultraviolet radiation. The region(s) can be created using a filler material, which is at least substantially enclosed by the fluoropolymer-based material and subsequently removed from each region. The structure can further include at least one optical element integrated into the light guiding structure. Embodiments of the light guiding structure can have thicknesses (as measured in a direction transverse to the propagation of light there through) of several micrometers.

Aspects of the invention can provide a method of fabricating a light guiding structure that can be thin (e.g., can be on the order of few microns, or even on the order of hundreds of nanometers) and can be easily utilized in small thin devices. An embodiment further provides a light guiding structure having a thickness on the order of few microns, or even on the order of hundreds of nanometers. Another embodiment provides a device, which includes a light guiding structure described herein. In an additional embodiment, a light guiding structure can include structural support members that enable the light guiding structure to support objects of targeted weights so that these objects can be irradiated with one or more light sources that can be deployed with the light guiding structure. In one embodiment, the structural support members can include the use of pillars that can extend between various layers in the light guiding structure and crisscrossing support members placed between pairs of adjacent pillars in a layer. The light guiding structure can also include a set of diffusive elements configured to propagate light from the light source(s) in a diffusive manner.

As used herein, unless otherwise noted, the term "set" means one or more (i.e., at least one) and the phrase "any solution" means any now known or later developed solution. As also used herein, a layer is a transparent layer when the layer allows at least ten percent of radiation having a target wavelength, which is radiated at a normal incidence to an interface of the layer, to pass there through. A layer is highly transparent when the layer allows at least thirty percent of the radiation to pass there through, and a layer is substantially transparent when the layer allows at least eighty percent of the radiation to pass there through. Furthermore, as used herein, a layer is a reflective layer when the layer reflects at least ten percent of radiation having a target wavelength, which is radiated at a normal incidence to an interface of the layer and is highly reflective when the layer reflects at least eighty percent of the radiation. It is understood that a layer can be both transparent and reflective. In an embodiment, the target wavelength of the radiation corresponds to a wavelength of radiation emitted or sensed (e.g., peak wavelength +/–five nanometers) by an active region of an optoelectronic device during operation of the device. For a given layer, the wavelength can be measured in a material of consideration and can depend on a refractive index of the material. It is understood that, unless otherwise specified, each value is approximate and each range of values included herein is inclusive of the end values defining the range.

Turning to the drawings, FIGS. 3A-3F show an illustrative process for forming a light guiding layer according to an embodiment. In FIG. 3A, a structure 10 including a thin fluoropolymer-based film 14 filled with a filler material 12 is fabricated. As used herein, a layer/film is thin when a thickness is significantly smaller than a characteristic absorption length for the corresponding target radiation (e.g., ultraviolet light). The characteristic absorption length can be measured as an inverse of the absorption coefficient for the material forming the layer and the corresponding target radiation. In an embodiment, the thickness is at most ten percent of the characteristic absorption length. A thickness of the filler material 12 can be defined based on an application of the light guiding layer fabricated therefrom as described herein.

Illustrative fluoropolymers forming the fluoropolymer-based film 14 include: fluorinated ethylene-propylene (EFEP), fluorinated ethylene propylene (FEP), perfluoroalkoxy (PFA), tetrafluoroethylene hexafluoropropylene vinylidene fluoride (THV), polytetrafluoroethylene (PTFE), polyvinylidene fluoride (PVDF), ethylene-tetrafluoroethylene (ETFE), ethylene chlorotrifluoroethylene (ECTFE), polychlorotrifluoroethene (PCTFE), a copolymer of tetrafluoroethylene and perfluoromethylvinylether (MFA), low density polyethylene (LDPE), perfluoroether (PFA), and/or the like. While primarily described in conjunction with fluoropolymers, it is understood that other comparable materials can be utilized. Illustrative materials include polylactide (PLA), fused silica, sapphire, THE, and/or the like. The filler material 12 can be any material that can be removed (e.g., etched) from the fluoropolymer-based film 14 using a process that does not damage the fluoropolymer-based film 14. In an embodiment, the filler material 12 is silicon dioxide. However, it is understood that any material that can be readily applied and dissolved, such as silicon nitride, and/or the like, can be utilized.

The structure 10 shown in FIG. 3A can be fabricated using any solution. For example, the filler material 12 can be applied onto a flat fluoropolymer-based film 14 using any solution, such as sputtering, until filler material 12 having desired dimensions has been formed. Alternatively, a layer (e.g., a sheet) of the filler material 12 having desired dimensions can be obtained (e.g., prepared) and placed adjacent to (e.g., onto, under, and/or the like) the fluoropolymer-based film 12. Subsequently, the fluoropolymer-based film 14 can be deposited around the filler material 12 using any solution, such as wrapping the filler material 12 with the fluoropolymer-based film 14 and subsequently heating the structure and allowing the fluoropolymer-based film 14 to set (harden) in order to seal the filler material 12 within the fluoropolymer-based film 14. In another embodiment, filler material 12 can be placed within a cavity including fluoropolymer-based pellets, such that the filler material 12 is surrounded by the fluoropolymer-based pellets. Subsequently, the fluoropolymer-based pellets can be heated to melt into a continuous film, forming the fluoropolymer-based film 14 tightly encapsulating the filler material 12. In this case, the dimensions of the cavity can be selected to result in the formation of a fluoropolymer-based film 14 having a desired thickness.

As shown in FIG. 3B, an opening 16 is formed in the fluoropolymer-based film 14 to expose the filler material 12 to the ambient. The opening 16 can be formed using any solution, such as mechanical removal of the fluoropolymer film using a drill, puncture, and/or the like, localized heating and/or chemical removal, etc. While the opening 16 is shown located on a side of the structure 10, it is understood that the opening 16 can be located in any desired location. Furthermore, it is understood that the opening 16 can have any dimension. While a single opening 16 is shown and described herein, it is understood that embodiments can use more than one opening 16.

As shown in FIG. 3C, the filler material 12 (FIGS. 3A and 3B) can be removed from the fluoropolymer-based film 14 using any solution. For example, the filler material 12 can be removed using a chemical etching approach. In this case, the structure 10 (FIG. 3B) can be placed in a bath of a chemical 20 that reacts with (e.g., dissolves) the filler material 12, but preserves the fluoropolymer-based film 14. The chemical 20 can pass through the opening 16 and react with and etch the filler material 12. For example, when the filler material 12 is silicon dioxide, the chemical 20 can be hydro-fluoric acid. However, it is understood that this is only illustrative of various chemicals 20 and filler material 12 that can be utilized.

As shown in FIG. 3D, an interior void left after the filler material has been removed can be filled with a fluid 22. For example, the fluoropolymer-based film 14 can be placed within a bath of the fluid 22, which can enter and fill the interior void left after the filler material 12 has been removed through the opening 16. The fluoropolymer-based film 14 can be completely submerged within such a bath or submerged at least enough to allow the fluid 22 to completely fill the interior void. To this extent, the placement of the opening 16, angle with which the fluoropolymer-based film 14 is placed within a bath, and/or the like, can be selected to facilitate completely filling the interior void with the fluid 22. Alternatively, the fluid 22 can be poured into the void through the opening 16. It is understood that embodiments can utilize a combination of two or more fluids to fill the void. In embodiment, the fluids include a liquid and a gas. Alternatively, the void can be completely filled by one or more liquids.

Regardless, the fluid 22 can be transparent to ultraviolet radiation. In an embodiment, the fluid 22 is substantially transparent to ultraviolet radiation, in which case the fluid 22 has a transparency at least similar (e.g., within ten percent) to the transparency of purified water for light wavelengths in the range of 240 nanometers to 360 nanometers. In an embodiment, the fluid 22 is purified water as defined by the U.S. Food and Drug Administration. Alternatively, the fluid 22 can be water sufficiently clean for human consumption.

As shown in FIGS. 3E and 3F, the opening 16 can be sealed using any solution. In an embodiment, the opening 16 is sealed while the opening 16 in the fluoropolymer-based film 14 remains submerged within the fluid 22 bath, e.g., to help ensure that the fluoropolymer-based film 14 is completely filled with the fluid 22 after being sealed. However, it is understood that this need not be the case. As shown in FIG. 3E, the sealant can comprise a sealing material 18A. The sealing material 18A can be any material that can effectively bind to the fluoropolymer-based film 14 and is sufficiently stable over a target time period, such as a suitable type of epoxy. In an embodiment, the sealing material 18A is a fluoropolymer-based material, which is placed over the opening and heated to bind with the fluoropolymer-based film 14. As shown in FIG. 3F, the sealant can comprise a mechanical sealant 18B, such as a clamp and screw. However, it is understood that these approaches are only illustrative of various sealants that can be utilized.

Figure 4A:
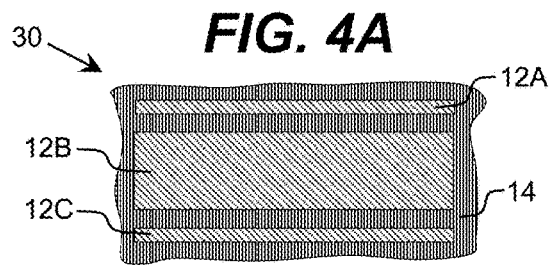
FIGS. 4A-4F show an illustrative process for forming a light guiding layer according to another embodiment.

FIGS. 4A-4F show an illustrative process for forming an alternative light guiding layer 30 according to another embodiment. In this case, the resulting structure includes multiple regions, which can include one or more different types of ultraviolet transparent fluid. In FIG. 4A, a structure 30 including a fluoropolymer-based film 14 encapsulating multiple distinct regions of filler material 12A-12C can be fabricated using any solution. For example, alternating layers of filler material 12A-12C and the fluoropolymer-based film 14 can be formed, the fluoropolymer-based film 14 can be wrapped around the layers of filler material 12A-12C to completely encapsulate them, and the fluoropolymer-based film 14 can be heated to seal the regions of filler material 12A-12C within the fluoropolymer-based film 14.

As illustrated, the structure 30 can include three regions of filler material 12A-12C, which can be arranged in a stack. Additionally, the regions of filler material 12A-12C can include one or more similar or distinct dimensions. For example, in the embodiment shown, the central region of filler material 12B has a larger thickness than the outer regions 12A, 12C, which have substantially similar thicknesses. However, it is understood that inclusion of three regions configured as shown is only illustrative. To this extent, in alternative embodiments, the structure 30 can include any number of two or more regions of filler material, arranged in any manner relative to one another, and having any combination of desired dimensions.

Figure 4B:
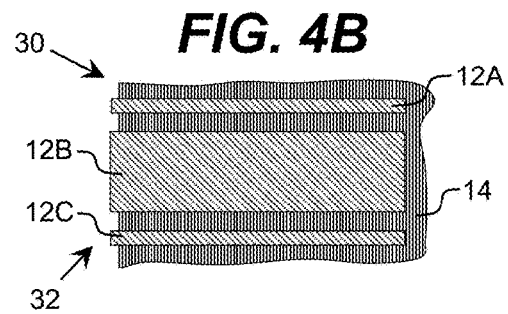

As shown in FIG. 4B, each of the regions of filler material 12A-12C can be exposed to ambient using any solution. For example, as shown in FIG. 3B, one or more openings 16 can be formed in the fluoropolymer-based film 14 to expose each region of filler material 12A-12C. Alternatively, as shown in FIG. 4B, some or all of a side 32 of the fluoropolymer-based film 14 can be removed to expose each region of filler material 12A-12C. For example, an elongated opening can be formed along the side 32 of the fluoropolymer-based film 14 having a depth sufficient to expose each region of filler material 12A-12C. In another embodiment, an entire side 32 of the fluoropolymer-based film 14 can be removed using any solution. In this case, an embodiment can include forming a structure 30 which does not completely encapsulate the regions of filler material 12A-12C with the fluoropolymer-based film 14, but at least substantially encapsulates the filler material 12A-12C, e.g., less than ten percent of the surface area is exposed. For example, the structure 30 can include filler material 12A-12C having only one side 32 (e.g., a side having the smallest dimension) exposed when the fluoropolymer-based film 14 is heated.

Figure 4C:
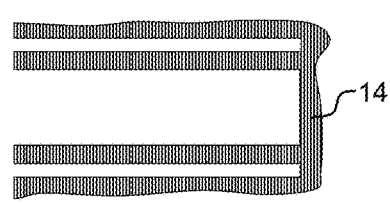

In FIG. 4C, the fluoropolymer-based film 14 is shown having the regions of filler material 12A-12C removed. Removal of the filler material 12A-12C can be done using any solution, e.g., chemical etching. When an entire side of a region of filler material 12A-12C is exposed, some or all of the filler material may be capable of being removed by sliding the filler material 12A-12C out from the fluoropolymer-based film 14. Subsequently, if necessary, any remaining filler material 12A-12C can be removed using, for example, chemical etching. Regardless, it is understood that these solutions are only illustrative.

Figure 4D:
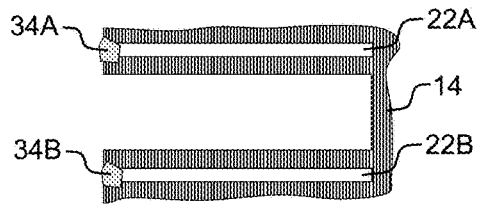

As shown in FIG. 4D, one or more of the regions vacated from the filler material 12A-12C can be encapsulated using any solution, such as a sealing material 34A, 34B, and/or the like. In this case, the corresponding ultraviolet transparent fluid 22A, 22B can be a gas having a low refractive index, such as ambient air. While FIG. 4D shows the outer two regions being encapsulated, it is understood that any combination of zero or more of the regions can be encapsulated to use a gas as the ultraviolet transparent fluid 22A, 22B. Furthermore, in another embodiment, all regions can be encapsulated, e.g., by applying a fluoropolymer-based film 14 over the side 32 (FIG. 4B) and heating the structure, and an opening can be reformed for a subset of the regions for which a different ultraviolet transparent fluid is desired to be utilized. While not shown, it is understood that the fluoropolymer-based film 14 can be placed in an environment including a gas other than ambient air to allow the gas to fill the vacated regions prior to sealing the regions with the sealing material 34A, 34B.

Figure 4E:
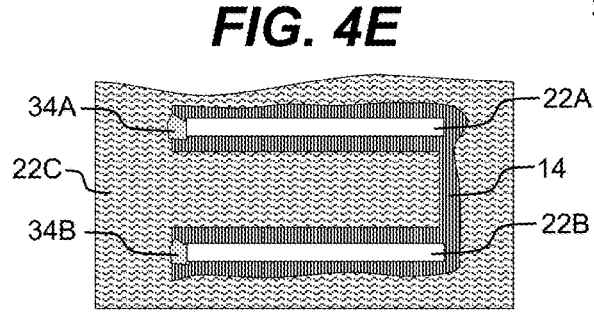
Figure 4F:
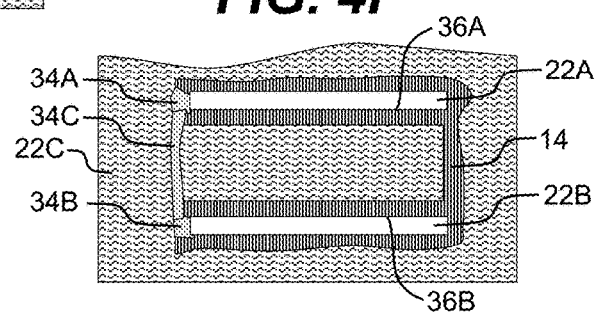

In FIG. 4E, the fluoropolymer-based film 14 can be placed within a fluid 22C (such as purified water), which can enter and fill the exposed region(s) of the fluoropolymer-based film 14. As shown in FIG. 4F, the exposed region(s) of the fluoropolymer-based film 14 can be encapsulated using any solution, e.g., by applying a sealing material 34C while the fluoropolymer-based film 14 remains within the fluid 22C.

The resulting structure can be configured to provide one or more benefits as compared to the structure formed from the process shown in FIGS. 3A-3F. For example, the fluids 22A, 22B can have a lower refractive index than that of the fluid 22C, thereby incorporating low refractive index guiding region(s) into the structure. Internal incorporation can ensure that there is no surface contamination present on either of the surfaces 36A, 36B, which could occur when the surfaces 36A, 36B are exposed to ambient, and which can reduce an effectiveness of using the structure as a light guide. In addition, the structure can be utilized within an ambient environment having a relatively high refractive index (e.g., within a liquid bath) without altering the light guiding properties of the structure.

When a fluid 22A, 22B is air, a gas, or the like, the corresponding fluoropolymer-based structure 14 can include one or more features configured to maintain a shape of the corresponding low refractive index guiding region filled with the fluid 22A, 22B. For example, the region can include one or more pillars, or similar structures, which can be formed from the fluoropolymer-based material. The pillars can be formed using any solution. For example, FIGS. 5A-5C show an illustrative process for forming pillars in a region according to an embodiment.

Figure 5A:
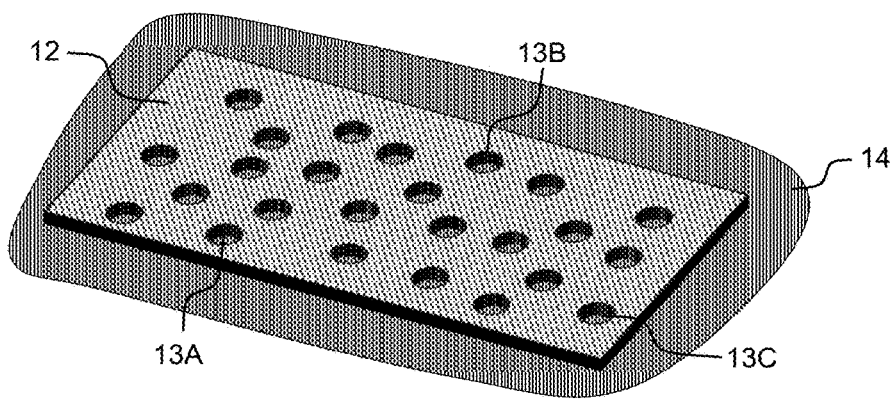
FIGS. 5A-5C show an illustrative process for forming pillars in a region according to an embodiment.

As shown in FIG. 5A, the filler material 12 includes a set of openings 13A-13C, which extend there through. The filler material 12 can include any number of one or more openings 13A-13C, which can be located in any pattern/random configuration and formed using any solution. Each opening 13A-13C can have a size sufficient to allow fluoropolymer-based material 14 to penetrate the opening 13A-13C when the filler material 14 is encapsulated. To this extent, the filler material 12 can be encapsulated by the fluoropolymer-based material 14, which can be a film, fluoropolymer-based pellets, and/or the like. Subsequently, the fluoropolymer-based material 14 can be heated as described herein, during which the fluoropolymer-based material 14 can penetrate and fill the openings 13A-13C. The fluoropolymer-based material 14 can be allowed to set, after which the filler material 12 can be removed, e.g., etched, using a process described herein.

Figure 5B:
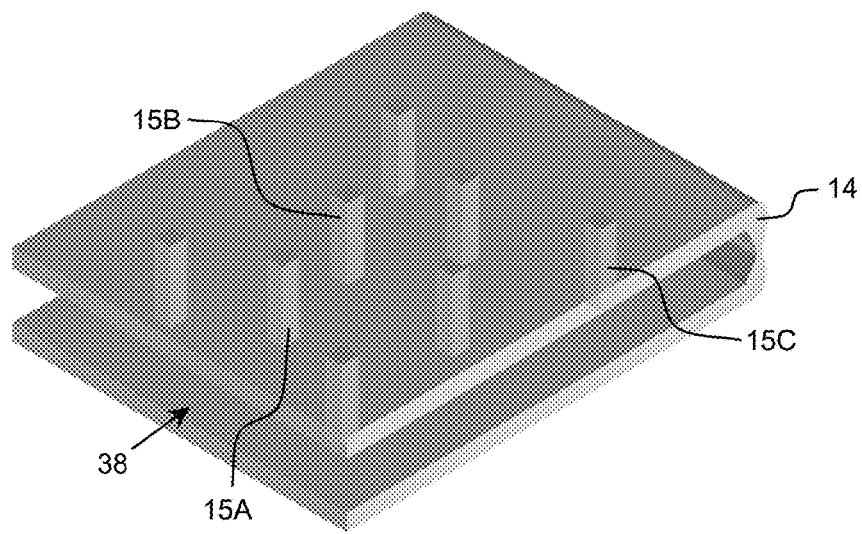
Figure 5C:
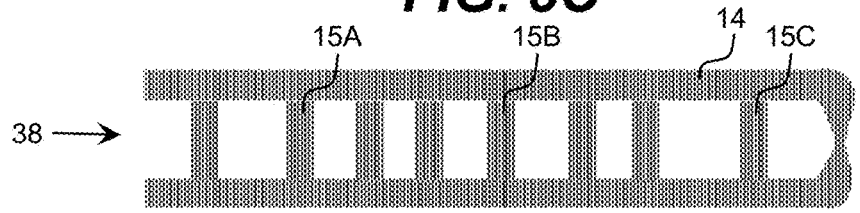

FIGS. 5B and 5C show perspective and side views of the resulting structure. As illustrated, the fluoropolymer-based material 14 forms a region 38 including a set of fluoropolymer-based pillars 15A-15C located therein. It is understood that the approach described herein is only illustrative of various approaches. For example, in another embodiment, the openings 13A-13C can be filled with a fluoropolymer-based material before the filler material 12 is encapsulated by the fluoropolymer-based material 14. In this case, the fluoropolymer-based material 14 can bond with the fluoropolymer-based material filling the openings 13A-13C when heated.

As described herein, the various structures can provide wave guiding in a system. To this extent, the structure can be located within the system such that light enters the structure at an angle optimal for wave guiding, e.g., at an angle larger than the total internal reflection angle for the structure.

Figure 6A:
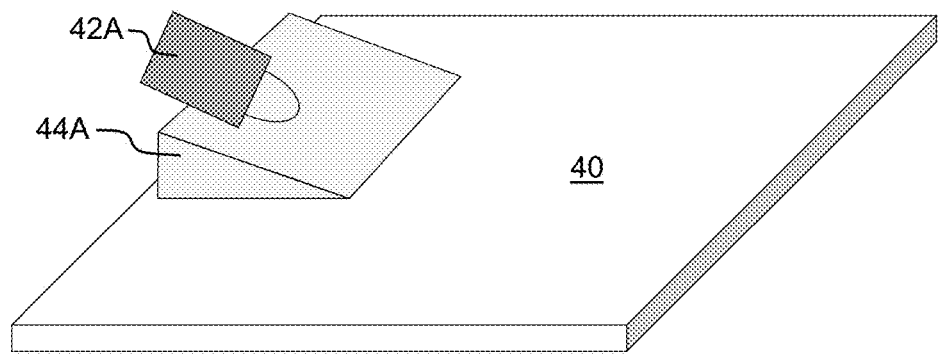
FIGS. 6A-6C show illustrative solutions for coupling an optoelectronic device to a light guiding structure according to embodiments.
Figure 6B:
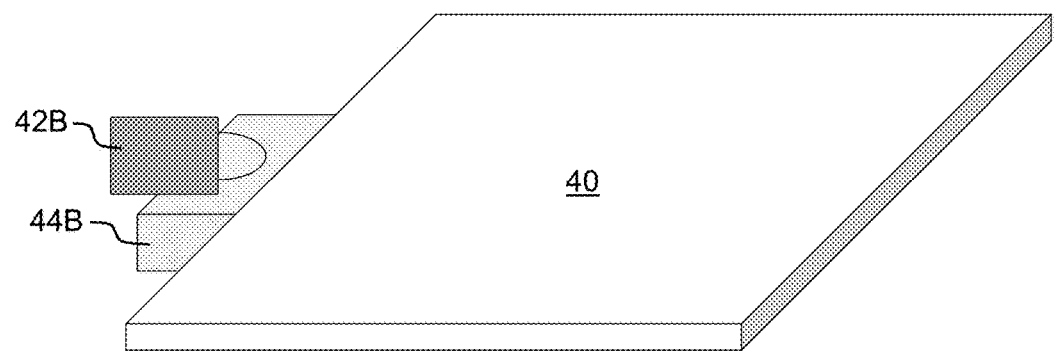
Figure 6C:
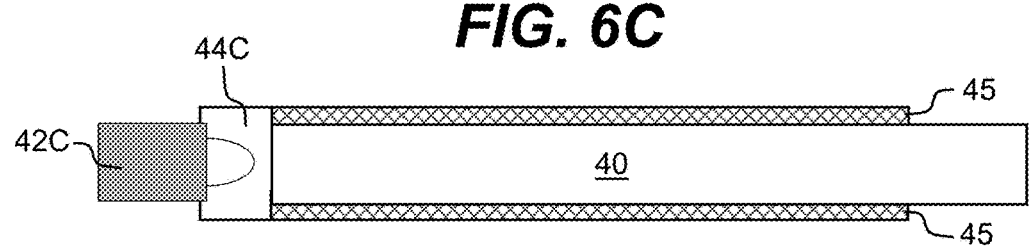

FIGS. 6A-6C show illustrative solutions for coupling an optoelectronic device 42A-42C to a light guiding structure 40 according to embodiments. Illustrative optoelectronic devices 42A-42C include a conventional or super luminescent light emitting diode, a light emitting laser, a laser diode, a light sensor, a photodetector, a photodiode, an avalanche diode, and/or the like. In an embodiment, the optoelectronic device 42A-42C is configured to operate as an ultraviolet light emitting device.

The light guiding structure 40 can be formed of a fluoropolymer-based material 14 and include one or more regions, each of which is filled with a fluid as described herein. In each case, the optoelectronic device 42A-42C can be embedded in a fluoropolymer-based domain 44A-44C, which is coupled to the light guiding structure 40. Each domain 44A-44C can be coupled to a desired location on the light guiding structure 40 using any solution, e.g., by locally heating a portion of the domain 44A-44C and/or structure 40 to allow the fluoropolymer-based material to flow. As illustrated in FIG. 6A, the optoelectronic device 42A can be fused into a side wall of the light guiding structure 40. Alternatively, as illustrated in FIGS. 6A and 6B, the optoelectronic device 42B, 42C can attached to an edge wall of the light guiding structure 40. While only a single optoelectronic device 42A-42C is shown in each of the drawings, it is understood that any number of optoelectronic devices 42A-42C can be coupled to the light guiding structure 40 in any of various possible combinations of locations.

Each domain 44A-44C can be configured to position the optoelectronic device 42A-42C at a desired angle with respect to the light guiding structure 40. For example, the angle can be selected to ensure that a majority of light (e.g., ultraviolet radiation) emitted by the corresponding optoelectronic device 42A-42C (e.g., ultraviolet light emitting diode), enters the light guiding structure 40 at an angle optimal for wave guiding. Similarly, the angle can be selected to ensure that light propagating through the light guiding structure 40 is directed onto a sensing surface of the optoelectronic device 42A-42C for sensing. However, it is understood that some portion of the light emitted by the optoelectronic device 42A-42C may not couple to the light guide, and may be radiated at the coupling interface.

As illustrated in FIG. 6C, an embodiment of the light guiding structure 40 can have one or more surfaces at least partially coated with a reflective film 45. The reflective film 45 can be configured to facilitate an increased coupling of the light emitted by the optoelectronic device 42C into the light guiding structure 40. Illustrative materials for forming the reflective film 45 include a reflective fluoropolymer, such as PTFE, and/or the like, a UV reflective film formed of aluminum, a highly ultraviolet reflective expanded polytetrafluoroethylene (ePTFE) membrane (e.g., GORE® Diffuse Reflector Material), and/or the like. The reflective film 45 can be applied to the surface(s) of the light guiding structure 40 using any solution, e.g., evaporation, sputtering, deposition from a liquid solution, and/or the like.

In an embodiment, the reflective film 45 has a variable spatial reflectivity. For example, a reflectivity of the reflective film 45 can decrease with distance away from the optoelectronic device 42C. It is understood that the reflective film 45 can be partially transparent and partially reflective, while maintaining constant absorption. The absorption characteristics of the reflective film 45 can be sufficiently small to allow significant light guiding and transmission. For example, as reflectivity of the reflective film 45 decreases, the transmission of the reflective film 45 can increase. Such changes in reflectivity of the reflective film 45 can promote uniform emission of light from an external surface of the reflective film 45. For example, the reflective film 45 can comprise a thin aluminum layer having openings wherein a size and/or density of the openings changes with distance from the optoelectronic device 42C to yield a target overall reflective and transparent properties of the reflective film 45. Alternatively, the reflective film 45 can comprise an alloy of reflective and transparent materials with a varying alloy composition.

The reflectivity of the reflective film 45 can be tailored for a particular application of the light guiding structure 40. For example, the reflectivity of the reflective film 45 can have a linear profile from highly reflective (near the optoelectronic device 42C) to a highly transparent film throughout a length of the light guiding structure 40. The reflectivity can range from a highly reflective film to complete transparency. Moreover, a type of reflectivity of the film can be attenuated as well. For example, the reflective film 45 can be specularly reflective in some domains while being diffusively reflective in other domains. Similarly, a transparency of the reflective film 45 can be specular or diffusive and can, in general, vary throughout the reflective film 45 depending on the application needs.

The solutions for fabricating a light guiding structure 40 described herein enables flexibility in the design of a shape of the light guiding structure 40 with a minimal increased cost. To this extent, a light guiding structure 40 fabricated as described herein can have any of various shapes, each of which can be configured to guide light (e.g., ultraviolet radiation) along a desired path. For example, FIGS. 7A-7D show illustrative light guiding structures 46A-46D, respectively, according to embodiments, each of which can be fabricated using a solution described herein.

Figure 7A:
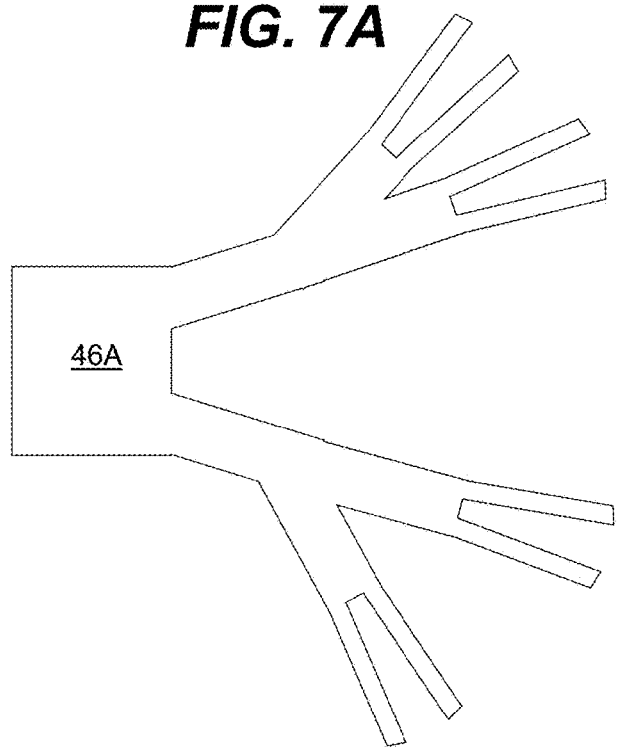
FIGS. 7A-7D show illustrative light guiding structures according to embodiments.
Figure 7B:
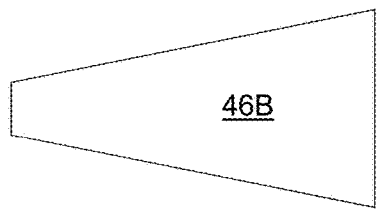
Figure 7C:
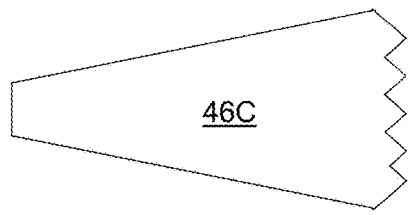
Figure 7D:
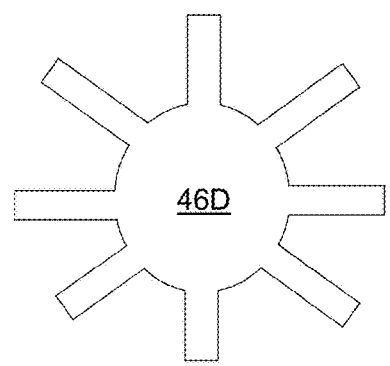

In FIG. 7A, the light guiding structure 46A includes multiple branches, and can be used to distribute radiation throughout a domain. In this case, the radiation can propagate along a path from the larger branches to the smaller branches (e.g., left to right in the drawing). Alternatively, the light guiding structure 46A can be used to combine radiation from throughout a domain, by guiding the radiation from the smaller branches to the larger branches (e.g., right to left in the drawing). In FIG. 7B, the light guiding structure 46B can be configured as a focusing element, in which case a cross-sectional area of the light guiding structure 46B can be changed to modify a directional distribution of the propagated light. For example, the light guiding structure 46B can have a truncated inverse pyramid or cone shape, which can act as a structure for collimating radiation. As illustrated in FIG. 7C, one or more surfaces of a light guiding structure 46C described herein can contain roughness or patterning, which can provide for diffusive output of the radiation from the light guiding structure 46C. Such roughness or patterning can be created using any solution, such as standard imprinting technology. FIG. 7D illustrates a light guiding structure 46D having a more complicated shape, which can be readily fabricated using a solution described herein.

Figure 8A:
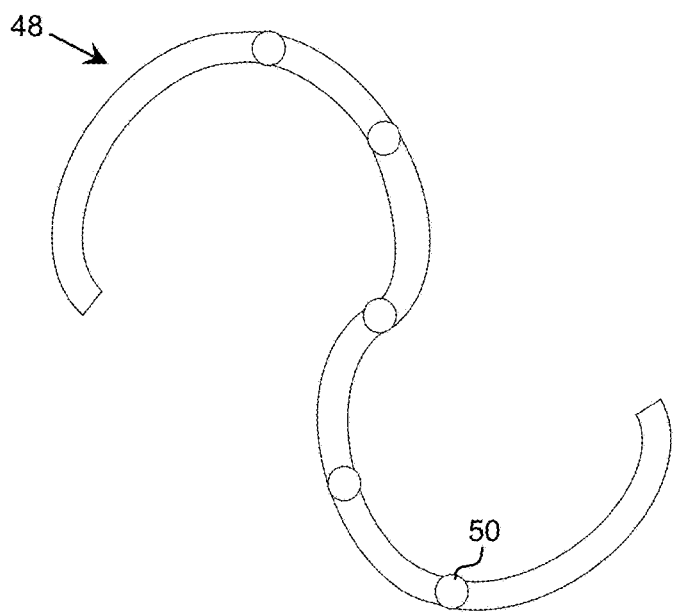
FIGS. 8A-8C show an illustrative light guiding structure according to an embodiment.
Figure 8C:
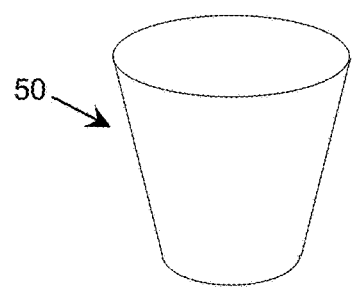
Figure 8B:
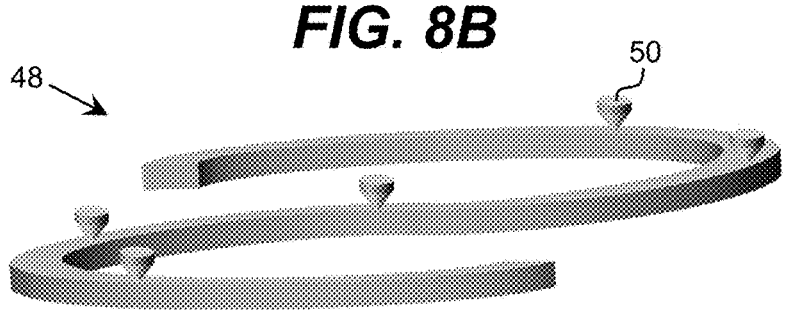

In still other embodiments, a light guiding structure fabricated using a solution described herein can have a bend and/or be elastic such that the structure can be bent to a desired bend without breaking. To this extent, FIGS. 8A-8C show an illustrative light guiding structure 48 according to an embodiment. As illustrated, the light guiding structure 48 can be fabricated with gradual bends and/or be bent into such a shape. In the latter case, the fluoropolymer material forming the light guiding structure 48 can have sufficient elasticity to enable the light guiding structure 48 to be bent. For example, EPTFE having a corresponding thickness can be utilized to enable a desired amount of bending. Additionally, multiple light guiding structures 48 can be connected together, e.g., to form a light guiding mesh, which allows for guiding radiation in a three-dimensional domain. Such a connection can be performed through welding individual light guiding structures into a complex structure, through a design of sockets that tightly attach one light guiding structure 48 to another, and/or the like.

In an embodiment, a light guiding structure described herein is included as part of a compound structure including one or more optical elements. As used herein, an optical element is a structure configured to extract, emit, sense, redirect, scatter, diffuse, focus, and/or the like, radiation propagating within or outside the light guiding structure. For example, FIGS. 8A-8C show an embodiment in which a light guiding structure 48 includes a set of light extraction elements 50, each of which allows a portion of radiation propagating through the light guiding structure 48 to be extracted therefrom. In an embodiment, each light extraction element 50 comprises a protrusion deposited over the light guiding structure 48 using any solution, e.g., by welding/fusing the light extraction element 50 to the light guiding structure 48. As best seen in FIG. 8C, a light extraction element 50 can be in a shape of an inverted truncated cone. However, it is understood that this is only illustrative, and a light extraction element 50 can have any of various alternative shapes including: a cylinder, a sphere, a pyramid, a cone, and/or the like. Furthermore, any combination of various types of light extraction elements 50 can be applied to the light guiding structure 48. In an embodiment, a characteristic dimension (e.g., the largest perpendicular cross-section) of each light extraction element 50 can be selected to be comparable to or exceed a thickness of the light guiding structure 48. Furthermore, a light extraction element 50 can comprise roughness elements, one or more lenses (e.g., Fresnel lenses), and/or the like.

Figure 9A:
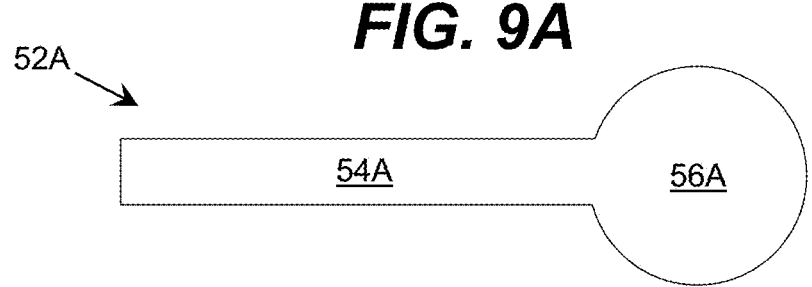
FIGS. 9A-9C show illustrative compound structures according to embodiments.
Figure 9B:
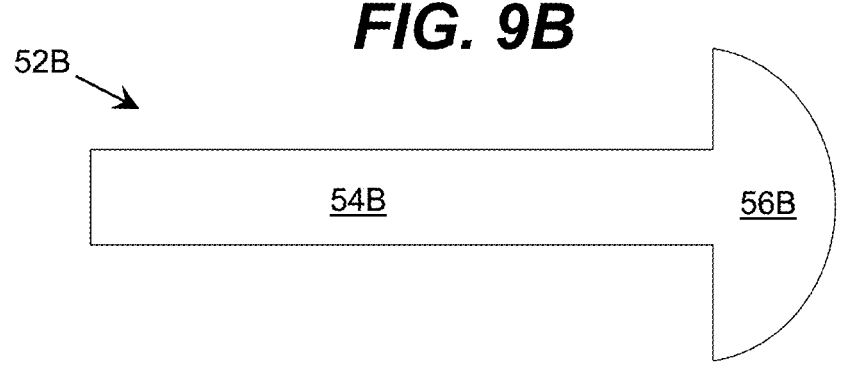
Figure 9C:
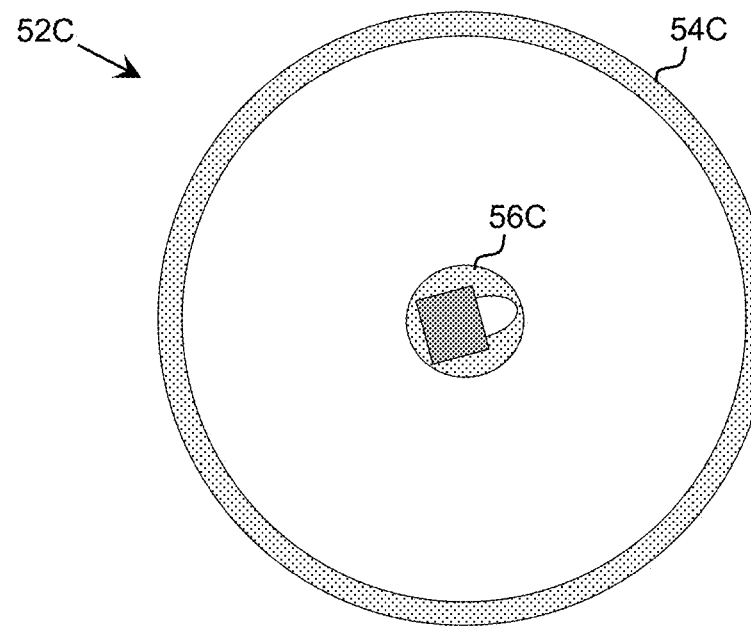

An illustrative compound structure can include an optical element fused with the light guiding structure. FIGS. 9A-9C show illustrative compound structures 52A-52C according to embodiments. Each compound structure 52A-52C includes a corresponding light guiding structure 54A-54C, each of which can be fabricated using a solution described herein.

In FIG. 9A, the compound structure 52A includes a light guiding structure 54A adhered to an optical element 56A, which can comprise a spherical lens, diffusive element, and/or the like. In FIG. 9B, the compound structure 52B includes a light guiding structure 54B adhered to an optical element 56B, which can comprise a lens. In each case, the optical element 56A, 56B can be filled with a fluid, engineered using a fluoropolymer described herein, comprise another type of ultraviolet transparent material (e.g., sapphire, fused silica, and/or the like), and/or the like. Regardless, it is understood that the optical elements 56A, 56B are only illustrative of various types of optical elements, which can be included. Other types of optical elements include a prism, a plate, and/or any other appropriate ultraviolet transparent protrusion designed to modify the spatial and/or angular distribution of the ultraviolet radiation guided through the corresponding light guiding structure 54A, 54B.

FIG. 9C shows a compound structure 52C, which includes an optical element 56C incorporated within the light guiding structure 54C. For example, the optical element 56C can comprise an ultraviolet radiation emitter encapsulated by a fluoropolymer material. The optical element 56C can be located within the light guiding structure 54C, which can be configured to affect one or more aspects of the radiation emitted by the emitter. For example, the light guiding structure 54C can comprise a sphere, which is configured to improve light extraction characteristics of the enclosed optical element 56C. While not shown, the optical element 56C can be held in a desired location within the light guiding structure 54C using any type of support structure (e.g., pillars), which can be fabricated using any solution.

Embodiments of a light guiding structure described herein can include an active optical element incorporated therein. As used herein, an active optical element comprises an element capable of having one or more attributes changed during operation of a system including the optical element. To this extent, an active optical element can include one or more components, which can be operated to dynamically alter one or more aspects of the operation of the optical element. For example, an active optical element can include one or more movable components, one or more components capable of changing shape, and/or the like, the result of which alters one or more aspects of the operation of the optical element. In an embodiment, the active optical element is a diffusive element.

Figure 10A:
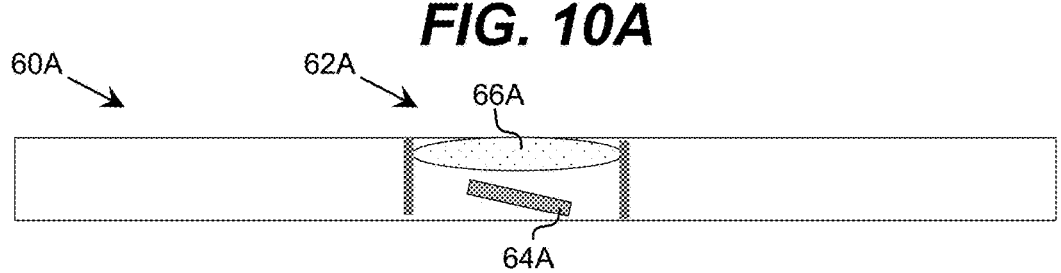
FIGS. 10A and 10B show illustrative light guiding structures including active optical elements according to embodiments.
Figure 10B:
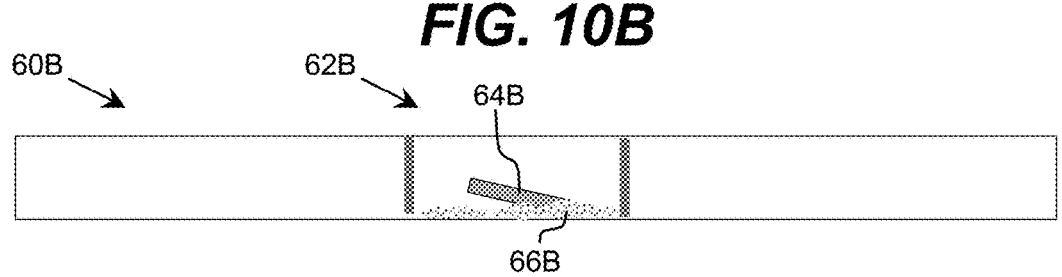

For example, FIGS. 10A and 10B show illustrative light guiding structures 60A, 60B including active optical elements 62A, 62B, respectively, according to embodiments. In each case, the active optical element 62A, 62B is defined by a region located within the light guiding structure 60A, 60B, which can be formed, for example, by transparent walls (e.g., formed of fluoropolymer) defining a compartment within the light guiding structure 60A, 60B corresponding to the active optical element 62A, 62B. Each active optical element 62A, 62B can include a movable component 64A, 64B, such as a magnetic stir. The movable component 64A, 64B can be moved to alter one or more optical properties of the optical element 62A, 62B.

For example, as shown in FIG. 10A, the movable component 64A can be operated to stir a bubble 66A present within the active optical element 62A, which can result in diffusive emission of ultraviolet radiation out of the active optical element 62A. In FIG. 10B, the movable component 64B can be operated to stir a reflective powder 66B located within the active optical element 62B, which can result in diffusive emission of ultraviolet radiation from the active optical element 62B. In each case, when the movable component 64A, 64B is not operated, the bubble 66A and reflective powder 66B can be located in a region of the active optical element 62A, 62B, which does not significantly impact the radiation propagating through the active optical element 62A, 62B. Regardless, it is understood that the active optical elements 62A, 62B and the configuration thereof, are only illustrative of various possible configurations. In other embodiments, an active optical element can include a mirror, diffuser, and/or the like, which can be actively or passively employed to alter one or more aspects of the radiation propagating through the corresponding light guiding structure.

Figure 11A:
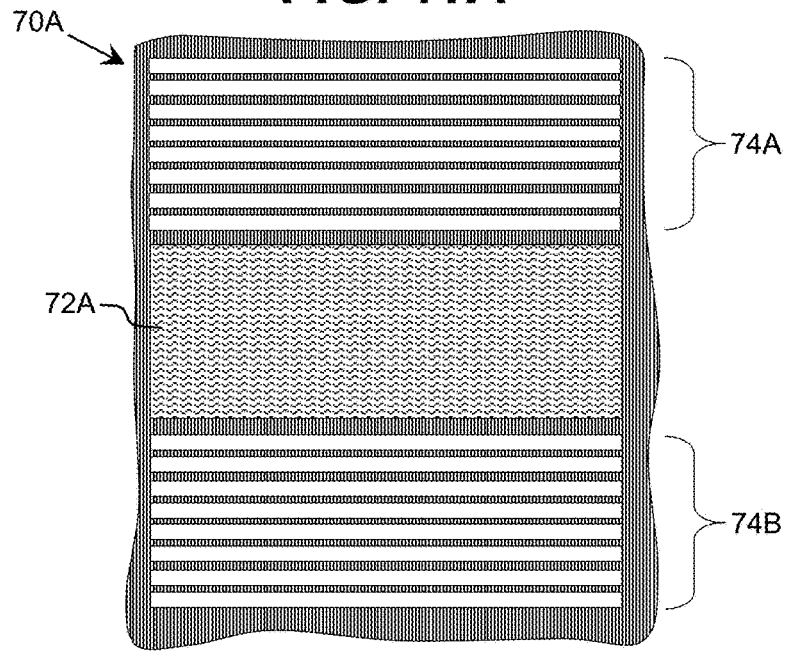
FIGS. 11A and 11B show illustrative light guiding structures according to embodiments.
Figure 11B:
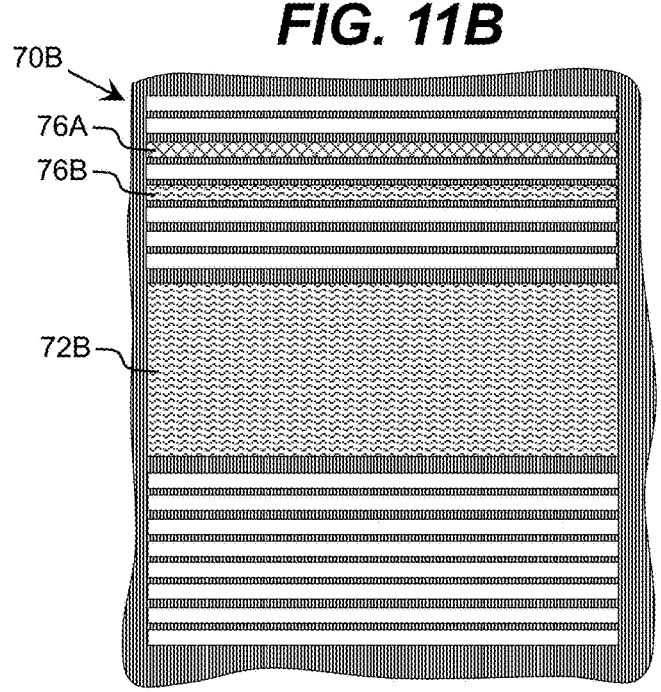

A light guiding structure described herein can be fabricated with numerous sub-regions, which can have various configurations and provide various functionality. For example, FIGS. 11A and 11B show illustrative light guiding structures 70A, 70B according to embodiments. Each light guiding structure 70A, 70B can be fabricated from a fluoropolymer-based material as described herein, and includes a central region with a fluid 72A, 72B located therein, which is configured to propagate radiation there through as described herein. Furthermore, each light guiding structure includes multiple layers located on opposing sides of the fluid 72A, 72B, one or more of which can include a low refractive index material, such as air. As used herein, a low refractive index material means a material having a refractive index at most ninety percent of the refractive index of the material forming adjacent layer(s) in a structure.

In FIG. 11A, the light guiding structure 70A can include multiple sub-regions 74A, 74B located on each side of the fluid 72A, which can be configured to at least partially implement a Bragg reflector. In this case, a thickness of each sub-region can be commensurate with the wavelength of the radiation propagating through the fluid 72A. However, for an incomplete Bragg reflector effect, a thickness can be several times the wavelength of the radiation and can have some variability in thicknesses. As illustrated in FIG. 11B, one or more sub-regions 76A, 76B can include a different material. For example, the sub-region 76A can include a material having fluorescent properties, e.g., in which the material emits visible light when exposed to ultraviolet radiation. Furthermore, the sub-region 76B can include a material having a different index of refraction from that of the adjacent sub-regions. To this extent, the sub-region 76B can be filled with an ultraviolet transparent fluid, which can be the same or different from the fluid 72B.

Figure 12A:
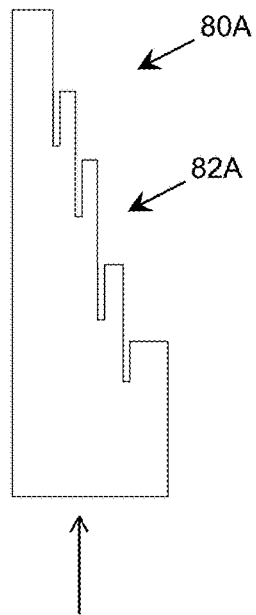
FIGS. 12A-12D show illustrative light guiding structures configured to emit radiation from multiple locations according to embodiments.
Figure 12B:
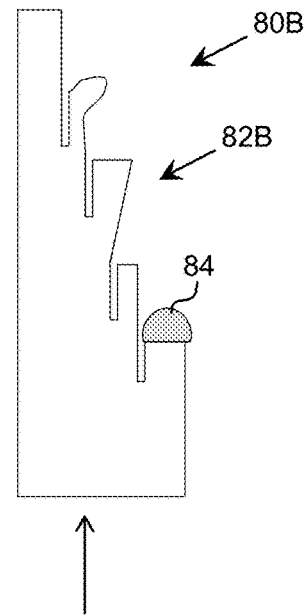
Figure 12C:
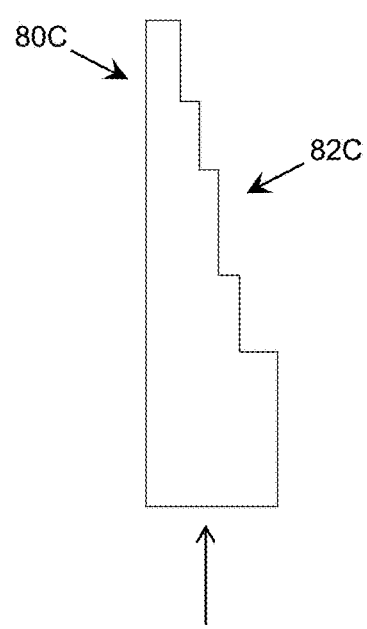
Figure 12D:
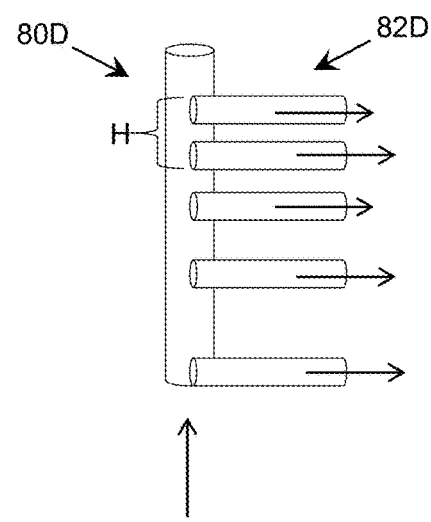

As described herein, a light guiding structure fabricated using a solution described herein can be configured to emit radiation from various locations. To this extent, FIGS. 12A-12D show illustrative light guiding structures 80A-80D configured to emit radiation from multiple locations according to embodiments. In each case, the light guiding structure 80A-80D includes a series of steps 82A-82D, respectively, from which a portion of radiation propagating through the light guiding structure 80A-80D is emitted. As illustrated, a series of steps 82A-82D can include steps of varying thickness, which can be selected based on a desired amount of radiation to be emitted therefrom. Furthermore, as shown in the series of steps 82B, the steps can be protrusions, which can have varying shapes, can include an optical element 84 (e.g., a lens, such as a Fresnel lens imprinted onto an output (or input) surface of the light guiding structure 80B), can be formed of any type of transparent material described herein, and/or the like. Additionally, as shown in FIG. 12D, adjacent steps can have a distance H between each other in order to emit radiation in a desired manner, e.g., having a target intensity distribution. To this extent, it is understood that the distance H can vary between different steps in a series of steps 82A-82D.

Figure 13A:
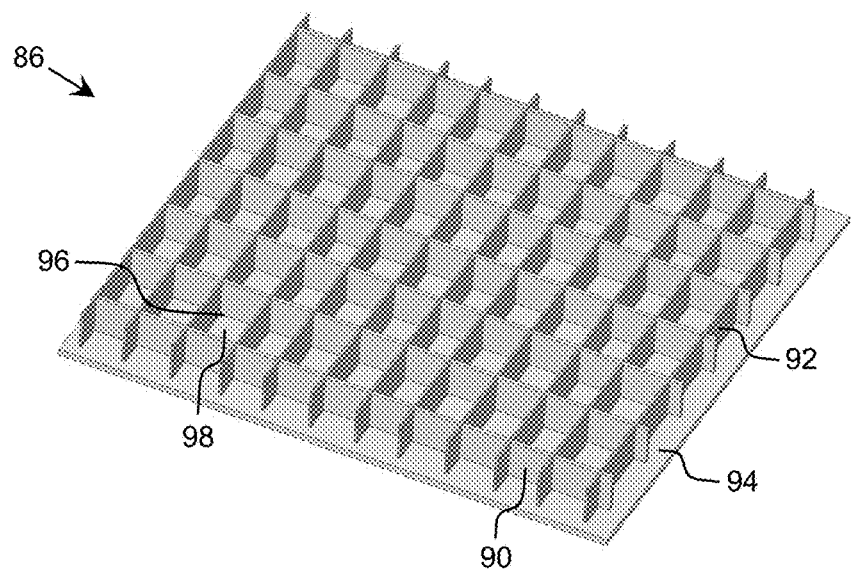
FIGS. 13A and 13B show illustrative light guiding structures having structural support according to embodiments.
Figure 13B:
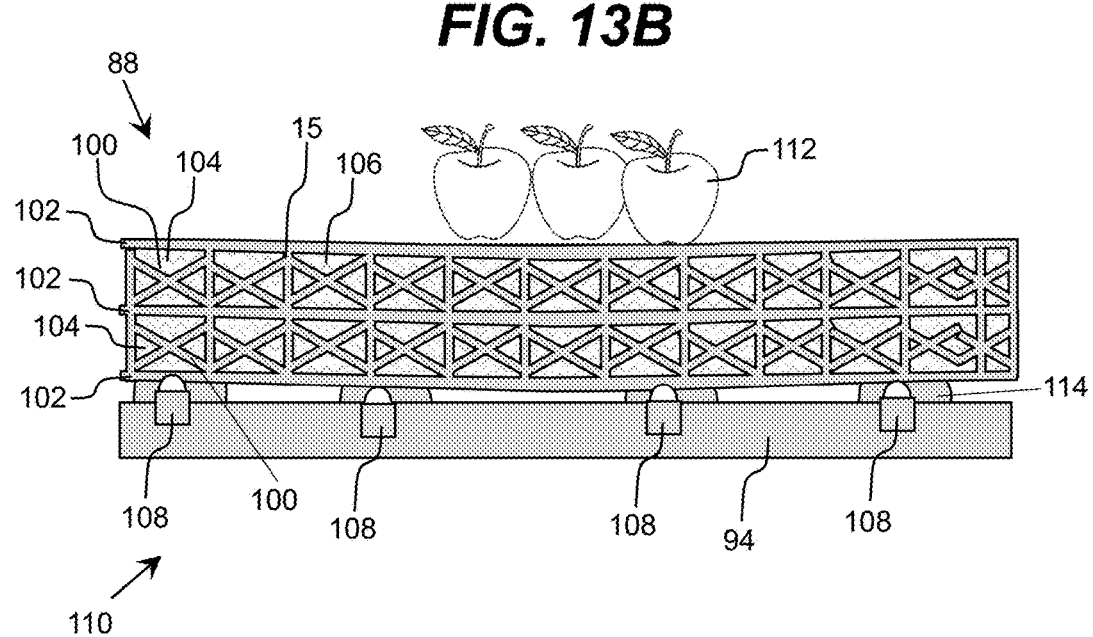

FIGS. 13A and 13B show illustrative light guiding structures 86 and 88, respectively having structural support according to embodiments. As shown in FIG. 13A, the light guiding structure 86 can include a plurality of horizontally extending fluoropolymer planes 90 and a plurality of vertically extending fluoropolymer planes 92 supported by a substrate 94. The horizontally extending fluoropolymer planes 90 and the vertically extending fluoropolymer planes 92 can take the form of I-beams layers that are capable of providing structural support for the light guiding structure 86. In one embodiment, each of the horizontally extending planes 90 can intersect with the plurality of vertically extending fluoropolymer planes 92. A plurality of ultraviolet transparent fluid layers 96 can be formed in regions 98 that are defined by the intersections of the horizontally extending planes 90 and the vertically extending fluoropolymer planes 92. In one embodiment, the plurality of ultraviolet transparent fluid layers 96 can include one of: a gas, water or air. Although not depicted in FIG. 13A, the light guiding structure 86 can include the use of one or more optical elements that are configured to extract, emit, sense, redirect, scatter, diffuse, focus, and/or the like, radiation propagating within or outside the light guiding structure. Furthermore, one or more light sources such as ultraviolet radiation sources can be coupled to the light guiding structure 86 and the substrate 94.

Any of the aforementioned fluoropolymers that can be used in fluoropolymer-based films can form the plurality of horizontally extending fluoropolymer planes 90 and the plurality of vertically extending fluoropolymer planes 92. Examples of specific fluoropolymers that can be used in fluoropolymer-based films to form the horizontally extending fluoropolymer planes 90 and the vertically extending fluoropolymer planes 92 can include, but are not limited to, EFEP, ETFE, PTFE (e.g., Teflon®), and the like.

The substrate 94 can include, but is not limited to, EFEP, ETFE, PTFE (e.g., Teflon®), $Al_2O_3$, $SiO_2$, and/or the like. In an embodiment, the substrate 94 can comprise typical household plastic such as polyethylene terephthalate, LDPE, and/or the like. In one embodiment, portions or the entire substrate 94 can include any ultraviolet transparent material such as an ultraviolet transparent fluoropolymer or waveguides formed from such a polymer. Any of the aforementioned fluoropolymers and other comparable materials are also suitable for use with the substrate 94. Other examples of material that can be used in the substrate 94 to waveguide, transmit and diffuse ultraviolet radiation can also include fused silica, sapphire, quartz, anodized aluminum oxide (AAO), and fluoride based materials such as calcium fluoride ($CaF_2$) or magnesium fluoride ($MgF_2$), and/or the like.

Although not depicted in FIG. 13A, the light guiding structure 86 can include the use of one or more light sources such as ultraviolet radiation sources that are coupled to the light guiding structure 86 and the substrate 94. These ultraviolet radiation source(s) can comprise any combination of one or more ultraviolet radiation emitters to form an ultraviolet treatment system. Examples of ultraviolet radiation emitters can include, but are not limited to, high intensity ultraviolet lamps (e.g., high intensity mercury lamps), discharge lamps, ultraviolet light emitting diodes (LEDs), super luminescent LEDs, laser diodes, and/or the like. In one embodiment, the ultraviolet radiation source(s) can include a set of LEDs manufactured with one or more layers of materials selected from the group-III nitride material system (e.g., $Al_xIn_yGa_{1-x-y}N$, where $0 \leq x$, $y \leq 1$, and $x+y \leq 1$ and/or alloys thereof).

The ultraviolet radiation source(s) can be formed in or coupled to the substrate 94 in any of a multiple of different arrangements. For example, the ultraviolet radiation source(s) can be monolithically embedded into the substrate 94 either through an opening on the first side of the substrate 94, or by incorporating the ultraviolet radiation source(s) inside the substrate 94. In one embodiment, the ultraviolet radiation source(s) can be attached to the substrate via a coupling port that is located in an opening or cavity of the substrate 94. The coupling port can comprise a cavity formed to allow a tight insertion of an LED, with the cavity having ultraviolet transparent walls that are configured to accommodate placement of the ultraviolet radiation source(s) as well as removal therefrom. In this manner, the coupling port can propagate ultraviolet radiation emitted from the ultraviolet radiation source(s).

The light guiding structure 86 comprises a region having an index of refraction that, in general, can be higher than the surrounding ambient (air) and includes the horizontally extending fluoropolymer planes 90, the vertically extending fluoropolymer planes 92, the ultraviolet transparent fluid layers 96 formed in the regions 98, and the substrate 94, each of which can be formed using any solution.

The structural support members utilized by the light guiding structure 88 depicted in FIG. 13B can include the use of pillars 15 that extend between the various layers that form the light guiding structure and crisscrossing support members 100 placed between pairs of adjacent pillars in a layer. The various layers of the light guiding structure 88 can include alternating layers of a fluoropolymer layer 102 and an ultraviolet transparent fluid layer 104. The fluoropolymer layers 102 can include any of the aforementioned fluoropolymer materials used to form fluoropolymer films. These fluoropolymer materials can also be used to form the set of pillars 15 that contact each of the fluoropolymer layers 102 in the light guiding structure 88. The fluoropolymer layers 102 and the set of pillars 15 can form fluoropolymer planes that provide structural stability in the light guiding structure 88. In one embodiment, the fluoropolymer layers 102 and the set of pillars 15 can form a plurality of horizontally extending fluoropolymer planes and a plurality of vertically extending fluoropolymer planes, respectively, wherein each of the horizontally extending planes intersects with the plurality of vertically extending fluoropolymer planes.

In this configuration, the ultraviolet transparent fluid layer 104, which can include one of: a gas, air or water, can be disposed between the fluoropolymer planes that form the fluoropolymer layers 102. In this manner, the set of pillars 15 can separate the ultraviolet transparent fluid layer 104 into multiple regions 106 each having an ultraviolet transparent fluid. Also, the ultraviolet transparent fluid layer 104 in these regions 106, which can be essentially voids or cavities, can serve to further balance the stresses through the distribution of pressure, and provide improved wave guiding and reduction of total internal reflection.

The crisscrossing support members 100 can provide additional structural stability for the light guiding structure 88. In one embodiment, each crisscrossing support member 100 can be placed between pairs of adjacent pillars 15 in a layer of the light guiding structure 88. For example, each of the multiple regions 106 of the light guiding structure 88 can include a pair of the crisscrossing support members 100. In this manner, the crisscrossing support members 100 crisscross with each other to contact a pair of pillars 15 that defines one of the regions 106. In one embodiment, the multiple regions of crisscrossing support members 100 placed between the pillars 15 in the ultraviolet transparent fluid layer 104 can form a lattice-type truss.

The light guiding structure 88 with these multiply-connected film surfaces that are designed for structural stability is suitable for holding objects and articles of various targeted weights, while being highly transparent to ultraviolet radiation (i.e., transmit at least 30% of ultraviolet radiation). It is understood that the light guiding structure 88 with these multiply-connected film surfaces can be designed with further structural stability in order to accommodate objects with heavier weights. For example, the fluoropolymer layers 102, the ultraviolet transparent fluid layer 104, and the set of pillars 15 may be linked in other configurations to provide more stability without significantly sacrificing the transparency of the light guiding structure 88. Furthermore, other approaches of buttressing the fluoropolymer layers 102 with or without the crisscrossing support members 100 is within the scope of the embodiments described herein.

The light guiding structure 88 comprises a region having an index of refraction that, in general, can be higher than the surrounding ambient (air) and includes the fluoropolymer layers 102, the ultraviolet transparent fluid layers 104, the pillars 15, and the crisscrossing support members 100, each of which can be formed using any solution.

As shown in FIG. 13B, one or more light sources 108 can be implemented with the light guiding structure 88 and the substrate 94 to form a system 110 such that the light sources 108 can be configured to direct light or radiation to at least one object 112 placed on the multi-layered light guiding structure 88. In one embodiment, the light sources 108 can be disposed or integrated across the length of the substrate 94. A coupling mechanism 114 can couple the substrate 94 with the one or more light sources 108 to the light guiding structure 88. In one embodiment, the coupling mechanism 114 can include a domain formed of a fluoropolymer-based material described herein, in which the light source 108 is embedded or fused thereto. It is understood that any of the above-mentioned ultraviolet radiation sources are suitable for use as one of the light sources 108.

The system 110 formed from the light guiding structure 88, the one or more light sources 108 and the substrate 94 can be used as a diffusive illuminator or diffusive waveguide. For example, in one embodiment, the system can be implemented with an appliance such as a refrigerator, e.g., in a shelf used for storage of produce. FIG. 13B shows the object 112 as a piece of fruit, however, it is understood that the system could be used in the irradiation of other types of produce or food articles that can be stored in a refrigerator or appliance, and are susceptible to germ build-up that may necessitate a disinfection operation. It is understood that the light guiding structure 88 can be designed with the appropriate amount of structural stability to support the storage of articles of various targeted weights.

Furthermore, although FIG. 13B depicts the system 110 in use as a storage application for objects 112 that can include food produce, it is understood that the system 110 is not meant to be limited solely to this scenario. For example, the system 110 can be used in a medical environment in which medical equipment may have a need to undergo an ultraviolet radiation operation for purposes of disinfection.

It is also understood that the light guiding structure 86 of FIG. 13A can be implemented with one or more light sources and used in a system to act as a diffusive illuminator or diffusive waveguide like the system 110 in a similar as described with respect to FIG. 13B. The horizontally extending fluoropolymer planes 90, the vertically extending fluoropolymer planes 92, the ultraviolet transparent fluid layers 96 formed in the regions 98 could be designed accordingly to accommodate the targeted weights of the various objects or articles that would be supported by the light guiding structure 86, for all types of applications that could also include, but is not limited to, food storage, food processing, food handing, medical equipment cleaning, and/or the like, where it may be desirable to irradiate objects for disinfection or other forms of germicidal cleansing. For example, several layers of the horizontally extending fluoropolymer planes 90 and the vertically extending fluoropolymer planes 92 in the form of I-beam layers can be incorporated into a transparent shelf structure for use in any one of the applications described herein.

Figure 14:
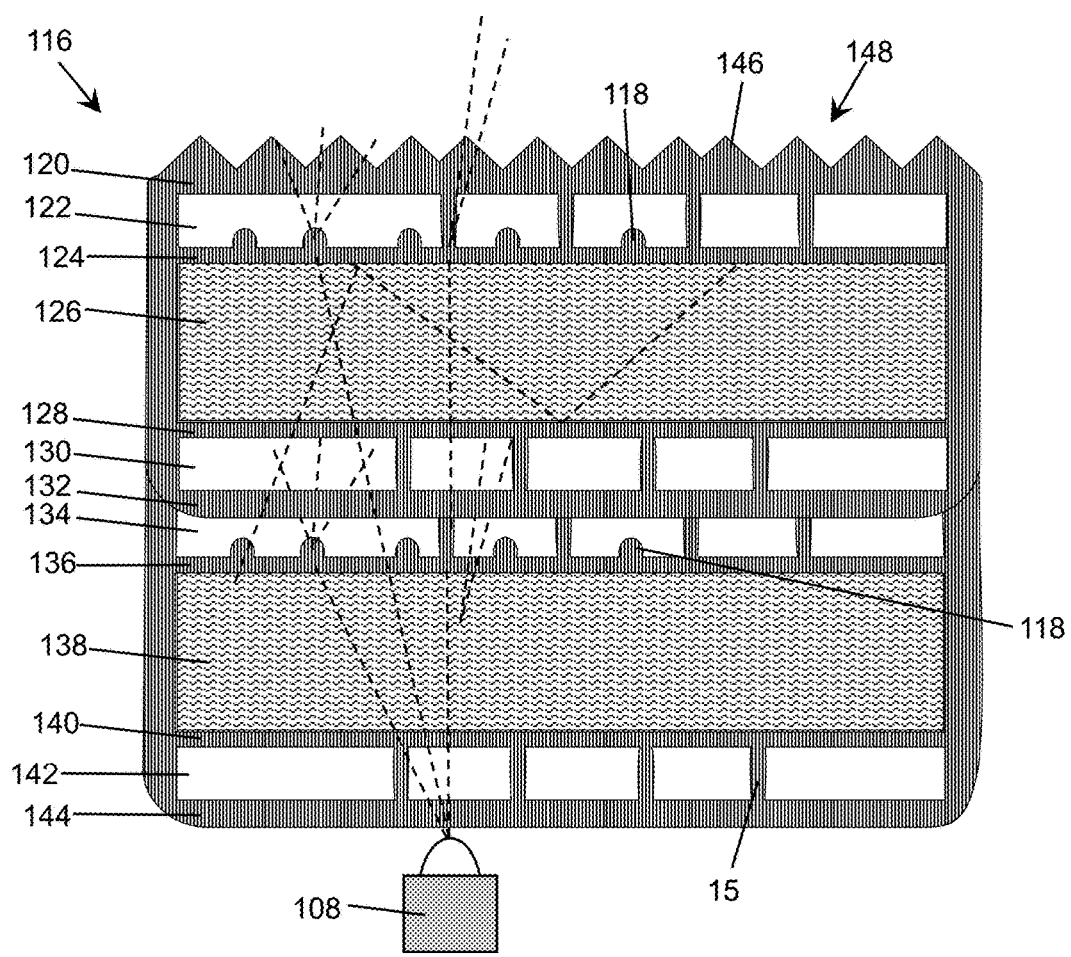
FIG. 14 shows an illustrative light guiding structure having structural support and diffusive elements according to an embodiment.

FIG. 14 shows an illustrative light guiding structure 116 having structural support and diffusive elements 118 according to an embodiment. The cross-sectional view of FIG. 14 shows that the light guiding structure 116 can include a multilayer structure including layers 120-144. Layers 120-144 can be formed of any suitable type of transparent material. For example, any of the aforementioned fluoropolymers are suitable for use as layers 120-144. In addition, any of the aforementioned highly transparent materials such as, for example, polylactide (PLA), fused silica, sapphire, THE, and/or the like, can be used with layers 120-144. Furthermore, each of the layers 120-144 can have a thickness, which is sufficiently thin to provide a desired level of transparency.

The layers 122, 126, 130, 134, 138 and 142 of the light guiding structure 116 can be filled with any of the aforementioned ultraviolet transparent fluids. For example, in one embodiment, the layers 122, 130, 134, and 142 can be filled with a transparent gas while the layers 126 and 138 can be filled with a transparent liquid. In an embodiment, the gas in the layers 122, 130, 134, and 142 can have a low refractive index (e.g., at most ninety percent of the refractive index of the material forming the adjacent layers 120, 124, 128, 132, 136, 140 and 144), such as ambient air. In an embodiment, the liquid in the layers 126 and 138 can be substantially transparent to ultraviolet radiation. In this case, the liquid can have a transparency at least similar (e.g., within ten percent) to the transparency of purified water for light wavelengths in the range of 240 nanometers to 360 nanometers. In an embodiment, the liquid in the layers 126 and 138 can be purified water as defined by the U.S. Food and Drug Administration. Alternatively, the liquid can be water sufficiently clean for human consumption (potable water).

In the light guiding structure 116, the layers 122, 130, 134 and 142 can further include a corresponding set of pillars 15 formed there through that include a fluoropolymer-based material described herein. The pillars 15 can be configured to maintain a shape of the corresponding low refractive index guiding layers 122, 130, 134 and 142 respectively. To this extent, the pillars 15 can be located in any pattern/random arrangement and can have any combination of one or more sizes and/or shapes, which is suitable for providing a desired amount of support. While not shown, it is understood that any fluid-filled layer, such as the layers 126 and 138, can include a set of pillars. Also, the pillars 15 can be staggered in relation to each other.

As illustrated in FIG. 14, a light source 108 can be positioned proximate a bottom surface of the light guiding structure 116 (e, g., adjacent to layer 144). In another embodiment, the light source 108 can be coupled to the light guiding structure 116 via a coupling mechanism that can hold the light source(s) in place. In an embodiment, at least thirty percent of the light generated by the light source 108 can be guided by the light guiding structure 116. While only a single light source 108 is shown, it is understood that any number of light sources 108 can be coupled to the light guiding structure 116 in any of a various possible combinations of locations.

The diffusive elements 118 can function in the light guiding structure 116 to propagate light from the light source 108 in a diffusive manner as indicated by the dash lines which are representative of the rays of light. In one embodiment, a set of diffusive elements 118 can be disposed in the layers 124 and 136. It is understood that the diffusive elements can be associated with (e.g., located within, located on, extend from, and/or the like) any of the other layers of the light guiding structure 116 to diffuse light emitted by the light source 108 and guided by the light guiding structure 116. Furthermore, it is understood that the representation of the diffusive elements 118 in the light guiding structure 116 is only illustrative of one possible implementation in which the diffusive elements can be configured. Those skilled in the art will appreciate that more or less layers of the light guiding structure 116 can have the diffusive elements.

The diffusive elements 118 can have any of various shapes including: truncated cones, lens, spheres, pyramids, inverted truncated cones, inverted pyramids, and/or the like. Furthermore, it is understood that a set of diffusive elements 118 can include a combination of diffusive elements of two or more different shapes. The diffusive elements 118 can be formed using any solution, such as surface patterning or roughening, welding/fusing the diffusive elements 118 to the corresponding layer 124 and 136, and/or the like.

Additionally, one or more of the layers 120, 124, 128, 132, 136, 140, and 144 can be formed of and/or coated with a reflective material. When utilized, a reflective coating can be located over an entirety of the layers 120, 124, 128, 132, 136, 140, and 144, or only a portion of these layers. Furthermore, the reflective coating can be located on either the outermost or innermost surface of the layers 120, 124, 128, 132, 136, 140, and 144. In addition, the layers 120, 124, 128, 132, 136, 140, and 144 can be partially reflective and partially transparent, and have a small ultraviolet absorption. It is understood that ultraviolet absorption can be minimized, subject to other optimization parameters.

The light guiding structure 116 can further include a set of prisms 146 located on an outermost surface of the layer 120, which can form an encapsulant of the light guiding structure.

In this manner, the set of prisms 146 located on the outermost surface of the layer 120 can form an emission surface 148 of the light guiding structure 116. The prisms 146 can alter an angular distribution of the emitted radiation from the emission surface 148 of the light guiding structure 116. As a result, the set of prisms 146 and the set of diffusive elements 118 in the light guiding structure 116 can operate cooperatively to result in diffusive light being emitted from a large surface area of the emission surface 148. While the diffusive-based light guiding structure 116 is depicted in FIG. 14 as having a rectangular cuboid shape, it is understood that this is only illustrative, and the diffusive-based light guiding structure can have any desired shape.

While shown and described herein as a method of fabricating a structure including a light guiding structure, it is understood that aspects of the invention further provide various alternative embodiments. For example, embodiments of the invention further include the various structures shown and described herein. Additionally, embodiments of the invention include systems, such as ultraviolet-based sterilization systems, which incorporate a structure described herein, as well as the fabrication of such systems. To this extent, the fabrication of such a system can include integrating a structure described herein as well as connecting one or more of the electronic devices described herein to a control system capable of providing power to and operating the electronic device in a desired manner. Such integration and connections can be performed using any solution.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A light guiding structure, comprising:
   at least one ultraviolet transparent fluid region; and
   an ultraviolet transparent enclosure having walls to enclose the at least one ultraviolet transparent fluid region, the ultraviolet transparent enclosure including a set of pillars, each pillar extending through the at least one ultraviolet transparent fluid region to directly contact opposing walls of the ultraviolet transparent enclosure, wherein the walls and the set of pillars of the ultraviolet transparent enclosure define a single unitary structure made from a same fluoropolymer-based material.

2. The light guiding structure of claim 1, wherein at least one of the set of pillars separates the at least one ultraviolet transparent fluid region into multiple regions, each having an ultraviolet transparent fluid, and wherein the ultraviolet transparent enclosure comprises:
   an inner enclosure including a multi-layered structure, wherein at least one layer of the multi-layered structure is supported by the set of pillars, wherein the at least one ultraviolet transparent fluid region is formed in the multi-layered structure between the pillars; and
   an outer enclosure enclosing the inner enclosure, wherein the set of pillars extend disjointedly from the multi-layered structure of the inner enclosure to the outer enclosure.

3. The light guiding structure of claim 2, wherein the inner enclosure and the outer enclosure each comprises a fluoropolymer, and wherein the set of pillars includes a predetermined number of pillars with an orientation that preserves a shape of the ultraviolet transparent enclosure.

4. The light guiding structure of claim 2, wherein the inner enclosure comprises a plurality of diffusive light scattering regions formed about the multi-layered structure.

5. The light guiding structure of claim 2, wherein the outer enclosure comprises an ultraviolet reflective exterior surface.

6. The light guiding structure of claim 2, wherein the multi-layered structure of the inner enclosure comprises at least one layer of a material having fluorescent properties.

7. The light guiding structure of claim 1, wherein the at least one ultraviolet transparent fluid region includes one of: a gas, water, or air.

8. The light guiding structure of claim 1, wherein at least one of the walls of the ultraviolet transparent enclosure includes a set of diffusive elements, each diffusive element configured to propagate light from a light source in a diffusive manner.

9. The light guiding structure of claim 1, wherein the ultraviolet transparent enclosure comprises at least one region with curved boundaries.

10. The light guiding structure of claim 1, wherein the ultraviolet transparent enclosure comprises a domain having several branches.

11. The light guiding structure of claim 1, wherein the ultraviolet transparent enclosure comprises an exterior surface having optical elements.

12. A system, comprising:
   at least one light source; and
   a light guiding structure configured to receive light generated from the at least one light source, the light guiding structure including:
      at least one ultraviolet transparent fluid region; and
      an ultraviolet transparent enclosure having walls to enclose the at least one ultraviolet transparent fluid region, the ultraviolet transparent enclosure including a set of pillars, each pillar extending through the at least one ultraviolet transparent fluid region to directly contact opposing walls of the ultraviolet transparent enclosure, wherein the walls and the set of pillars of the ultraviolet transparent enclosure define a single unitary structure made from a same fluoropolymer-based material.

13. The system of claim 12, wherein the at least one light source comprises an ultraviolet light emitting diode.

14. The system of claim 12, wherein at least one of the set of pillars separates the at least one ultraviolet transparent fluid region into multiple regions each having an ultraviolet transparent fluid, wherein each of the multiple regions includes a pair of structural support members that crisscross with each other to contact a pair of pillars that defines the region, the multiple regions of crisscrossing structural support members placed between the pillars in the ultraviolet transparent fluid layer forming a lattice-type truss.

15. The system of claim 12, wherein the at least one light source is optically coupled to the light guiding structure.

16. The system of claim 12, wherein the at least one light source comprises a predetermined position and orientation with respect to the light guiding structure that facilitates light guiding along the light guiding structure.

17. The system of claim 12, wherein the ultraviolet transparent enclosure comprises at least one surface with a roughness.

18. The system of claim 12, wherein the ultraviolet transparent enclosure comprises an active optical element.

19. The system of claim 18, wherein the active optical element comprises a set of moveable diffusive elements.

20. A system, comprising:
- at least one light source; and
- a light guiding structure optically coupled to the at least one light source to receive light generated from the at least one light source, the light guiding structure including:
  - at least one ultraviolet transparent fluid region; and
  - an ultraviolet transparent enclosure having walls to enclose the at least one ultraviolet transparent fluid region, wherein the ultraviolet transparent enclosure comprises:
    - an inner enclosure including a multi-layered structure supported by a set of pillars, wherein multiple regions of ultraviolet transparent fluid are formed in the multi-layered structure between the pillars; and
    - an outer enclosure enclosing the inner enclosure, wherein the set of pillars extend disjointedly from the multi-layered structure of the inner enclosure to the outer enclosure.

* * * * *